(12) United States Patent
Sharma et al.

(10) Patent No.: US 12,293,299 B1
(45) Date of Patent: May 6, 2025

(54) ANALYTICAL MODEL TO OPTIMIZE DEEP LEARNING MODELS

(71) Applicant: Amazon Technologies, Inc., Seattle, WA (US)

(72) Inventors: Vinod Sharma, Menlo Park, CA (US); Yao Wang, Newark, CA (US); Xingyu Zhou, Santa Clara, CA (US); Yanming Wang, Santa Clara, CA (US); Yong Wu, Shenzhen (CN); Rui Li, Salt Lake City, UT (US)

(73) Assignee: Amazon Technologies, Inc., Seattle, WA (US)

( * ) Notice: Subject to any disclaimer, the term of this patent is extended or adjusted under 35 U.S.C. 154(b) by 1006 days.

(21) Appl. No.: 17/338,047

(22) Filed: Jun. 3, 2021

(51) Int. Cl.
  *G06N 3/10* (2006.01)
  *G06F 9/38* (2018.01)
  *G06N 3/04* (2023.01)

(52) U.S. Cl.
  CPC .......... *G06N 3/10* (2013.01); *G06F 9/38873* (2023.08); *G06N 3/04* (2013.01)

(58) Field of Classification Search
  CPC ......... G06N 3/10; G06N 3/04; G06F 9/38873
  See application file for complete search history.

(56) References Cited

U.S. PATENT DOCUMENTS

| | | | | |
|---|---|---|---|---|
| 10,901,715 | B1 * | 1/2021 | Raiman | G06F 9/4552 |
| 2015/0213107 | A1 * | 7/2015 | Park | G06F 16/2365 |
| | | | | 707/602 |
| 2015/0220871 | A1 * | 8/2015 | Rajan | G06Q 10/063112 |
| | | | | 705/7.14 |
| 2017/0168487 | A1 * | 6/2017 | Mantripragada | G01N 33/0067 |
| 2019/0391796 | A1 * | 12/2019 | Brady | G06F 8/458 |
| 2021/0049231 | A1 * | 2/2021 | Majnemer | G06F 9/5016 |

(Continued)

OTHER PUBLICATIONS

L. Wills, T. Taha, L. Baumstark and S. Wills, "Estimating potential parallelism for platform retargeting," Ninth Working Conference on Reverse Engineering, 2002. Proceedings., Richmond, VA, USA, 2002, pp. 55-64, doi: 10.1109/WCRE.2002.1173064. (Year: 2002).*

(Continued)

*Primary Examiner* — Omar F Fernandez Rivas
*Assistant Examiner* — Corey M Sackalosky
(74) *Attorney, Agent, or Firm* — Nicholson De Vos Webster & Elliott LLP

(57) ABSTRACT

Techniques for optimizing and deploying deep neural network (CNN) machine learning models for inference using static analysis are described. A method includes obtaining a deep neural network (DNN) machine learning (ML) model, generating an intermediate representation for the ML model, the intermediate representation including one or more nodes corresponding to one or more operators utilized by the ML model, identifying, for at least one node of the intermediate representation, an optimized schedule for at least one operator corresponding to the at least one node using a static analysis that is based on a hardware-specific cost model, generating an optimized intermediate representation using the optimized schedule that is optimized for execution on a hardware platform, and generating code corresponding to the ML model based at least in part on the optimized intermediate representation, wherein the code is specific to the hardware platform.

20 Claims, 9 Drawing Sheets

(56) References Cited

U.S. PATENT DOCUMENTS

2021/0103433 A1* 4/2021 Kerr ............... G06N 3/045
2021/0158135 A1* 5/2021 Mills .............. G06F 9/545

OTHER PUBLICATIONS

Arafa et al., "PPT-GPU: Scalable GPU Performance Modeling", IEEE Computer Architecture Letters, Mar. 2019, pp. 1-5.

Chen et al., "Learning to Optimize Tensor Programs", 32nd Conference on Neural Information Processing Systems (NeurIPS 2018), Jan. 8, 2019, pp. 1-6.

Chen et al., "TVM: An Automated End-to-End Optimizing Compiler for Deep Learning", 13th USENIX Symposium on Operating Systems Design and Implementation (OSDI '18), Oct. 8-10, 2018, pp. 579-594.

Li et al., "Analytical Characterization and Design Space Exploration for Optimization of CNNs", In Proceedings of the Twenty-Sixth International Conference on Architectural Support for Programming Languages and Operating Systems, Apr. 19-23, 2021, pp. 928-942.

Li et al., Analytical Cache Modeling and Tilesize Optimization for Tensor Contractions, HAL, Dec. 19, 2019, pp. 1-13.

Zheng et al., "Ansor: Generating High-Performance Tensor Programs for Deep Learning", 14th USENIX Symposium on Operating Systems Design and Implementation, Nov. 4-6, 2020, pp. 863-879.

* cited by examiner

ANALYTICAL MODEL TO OPTIMIZE DEEP LEARNING MODELS

BACKGROUND

The recent advance of deep learning enables a number of sophisticated applications taking place at the edge, making the prevailing edge devices, such as cameras, speakers, televisions, mobile phones, around us "smart." These applications, which perform functions ranging from computer vision related tasks—such as image classification, object detection, and segmentation—to speech recognition and voice detection, typically leverage pre-trained deep learning models to perform inference using input data captured by the device. Although many edge devices send the input data to a remote server to perform the inference, it is becoming more and more desirable to execute the model inference directly at the edge devices for shorter latency, less burden of the network bandwidth, and better privacy protection to the users. However, this remains extremely difficult in practice, especially due to the difficulty in terms of programming.

BRIEF DESCRIPTION OF DRAWINGS

Various embodiments in accordance with the present disclosure will be described with reference to the drawings, in which.

DETAILED DESCRIPTION

Figure 1:
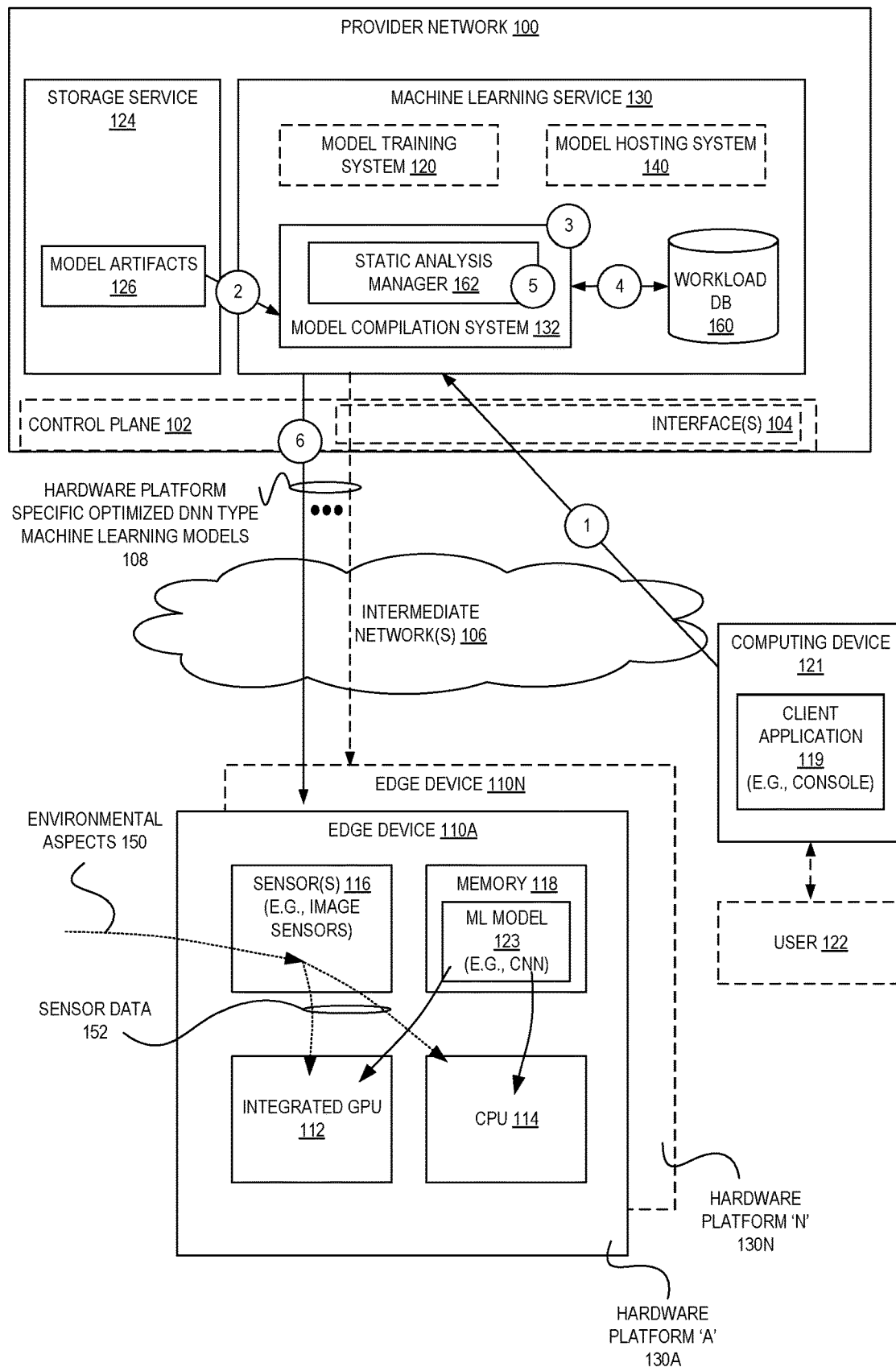
FIG. 1 is a diagram illustrating an environment for optimizing and deploying deep neural network models for inference using static analysis, according to some embodiments.

The present disclosure relates to methods, apparatus, systems, and non-transitory computer-readable storage media for optimizing deep learning models to run various hardware platforms using a static analytical model. In some embodiments, deep neural networks (DNNs), such as convolutional neural network (CNN) type machine learning models, can be optimized to run on integrated graphics processing units (GPUs) or central processing units (CPUs) of potentially multiple types of hardware platforms using an end-to-end system. The system can be incorporated into machine learning services to easily extend the supported hardware platform coverage and model coverage of its services.

Modern deep learning applications seek to execute model inference at edge devices for a variety of reasons, such as achieving shorter latency, relieving the burden of needing network connectivity to another network that would execute the inference, and protecting user privacy. For example, running deep models within edge devices (e.g., smart cameras, mobile devices, smart speakers, toys, etc.) can have the potential to allow inferences to be generated quicker (e.g., on a same device that obtains the data upon which the inference is generated, instead of remotely—such as in a cloud network or other centralized location) and enable faster reactions to these inferences to occur.

However, the hardware resources available to generate inferences (e.g., processing units such as central processing units (CPUs), GPUs, tensor processing units (TPUs), field programmable gate arrays (FGPAs), etc., the amounts and types of available memory, etc.) and the architectures of these hardware resources (e.g., instruction set architectures (ISAs) such as x86, ARM, MIPS, SPARC) and/or supported libraries vary significantly from one edge device to another. Particularly, in many cases the set of hardware resources offered by an edge device may be severely constrained due to a need to be low-powered and/or inexpensive, which creates a difficulty in being able to run sophisticated or large ML models. Further, new ML models are continually being developed that often rely on new types of operations or libraries, which may or may not be natively supported by a particular hardware platform (or its associated frameworks), even further reducing the ability of typical edge devices to make practical use of these models.

CNNs are one of the most widely used model families in modern applications. For example, some popular CNN-based models are used for image classification (ResNet, MobileNet, SqueezeNet, etc.) to object detection (SSD, Yolo), etc. Given the high computational complexity of CNN models, various hardware platforms have been developed to improve performance of these and other DNNs when running on edge devices. However, this leads to greater complexity when optimizing the models to run on devices having different hardware configurations. In the past, this has required manual tuning, which includes compiling a model using different optimizations and finding the optimization(s) that result in the best performance for a given hardware platform. If the model is later changed, then this tuning must be performed again, leading to significant time and energy required to optimize the model for a hardware platform.

Generating optimized deep neural networks (DNN) with low inference latency has become a significant challenge for computer vision, natural language processing and other artificial intelligence (AI) applications. A major aspect to optimize a DNN model is to generate efficient target code for compute intensive operators, such as convolution and matrix multiplication. One popular method to generate high performance kernel is search-based compilation guided by learning-based cost model. A search-based compilation approach usually defines a loop-based program transformation space which is large enough to cover useful optimizations. A machine learning model is trained as a cost model to guide a search algorithm. Compared to existing deep learning frameworks which integrate with vendor kernel libraries (e.g., TensorRT, OneDNN), search-based approaches require less engineering effort to handcraft efficient kernels for specific target platforms and operators.

However, there are several drawbacks that stop existing search approaches from being applied in large scale production systems. For example, training a cost model requires latency data from real hardware. A complete compilation, network communication, and run-time system is needed to dynamically profile kernels on a target platform. It is non-trivial to setup and maintain such a complex system. In many cases, a target device is even not accessible at compilation time and a fully cross-compilation schema is required. Additionally, existing search-based tuning is time consuming. It can take days to weeks to optimize a single DNN. Further, training a cost model requires a significant amount of profiling data on specific device and is hard to transfer to other similar hardware platforms. This leads to low utilization efficiency for data and hardware resources.

Embodiments address these issues when applying search-based compilation approaches in a large-scale platform using a hardware-based analytical cost model together with a search algorithm. As such, embodiments, enable optimization to be performed with static analysis and no real hardware is required. Additionally, the hardware-based cost model is transferable to different micro architectures. Only one single cost model is required for one major architecture. Static analysis takes significantly less time compared to dynamic profiling. Also, highly parallelizable tasks (such as the search algorithm, can fully utilize multicore CPU machine resources and reduce total analysis time. Embodiments use cost models for both CPU and GPU architectures. Compared to state-of-the-art solutions, embodiments reduce total compilation time while achieving better average performance comparing to dynamic profiled cost models.

FIG. 1 is a diagram illustrating an environment for optimizing and deploying deep neural network models for inference using static analysis according to some embodiments. FIG. 1 illustrates a model compilation system 132 that may generate an optimized DNN type machine learning model for execution by one or more edge devices 110A-110N.

A typical edge device 110 is implemented using a System on a Chip (SoC), which integrates various compute units such as CPU 114, GPU 114, and optionally an accelerator, a Digital System Processor (DSP) and/or Neural Processing Unit (NPU). The underlying hardware platform may vary widely across vendors. Depending on the performance of the CPU(s) and GPU(s) available on one platform relative to another, a model optimized to perform well on one platform may not perform well on another platform. As such, there is a need to optimize a given model to the specific hardware on which it will be deployed. This may include optimizing to perform inference on a particular CPU or GPU architecture. For example, in some instances, the integrated GPUs 112, although normally much less powerful than server-side discrete GPUs, may be able to deliver higher floating-point operations per second (FLOPs) than the accompanying CPUs 114. In practice, model inference at the edge is often executed on CPUs 114 because of easier programmability and more flexible portability across different SoCs.

However, it may be less favorable to execute deep learning model inferences on CPUs at the edge. First, the CPU is normally less powerful than the integrated GPU located in the same SoC. For example, in three common edge device platforms, the theoretical peak FLOPs of GPUs are about 5, 6, and 2.5 times greater than the accompanying CPUs, respectively. In addition, CPUs may suffer from power throttling when overheated, leading to dramatically reduced performance. Moreover, the execution time on CPUs is less stable compared to that of GPUs. Besides possible power throttling, the operating system of the device normally has multiple processes (e.g., daemons) periodically running on CPUs, which inevitably causes CPU resource contention and consequently high variance of the model inference duration.

In practice, integrated GPUs observe limited usage in deep learning model inference due to the lack of a generic solution enabling their use. The integrated GPUs in different SoCs from different chip vendors vary vastly. For example, there is a wide disparity between Intel® Graphics and ARM® Mali GPUs in terms of architecture. Intel Graphics has a subgroup concept when organizing the threads. The running threads within the same subgroup share the same register file. Thus, sharing data within a subgroup could boost the performance on Intel Graphics significantly. However, the subgroup concept is not present in ARM Mali GPUs, hence the optimization customized for Intel Graphics is not applicable to devices equipped with ARM Mali GPUs. In addition, different GPUs may require different software drivers and programming languages, such as CUDA on Nvidia® products and OpenCL on Intel and ARM products. Thus, it is difficult for developers to transfer the optimization solutions from one hardware platform to another, let alone guaranteeing reasonable performance.

To surmount these limitations, embodiments provide a unified end-to-end stack to deploy and optimize DNN models for efficient inference on different hardware platforms using cost models for both CPU and GPU architectures. However, embodiments are not limited only to edge GPU and CPU architectures but can also be used in more traditional server-centric environments. Optimizing DNN models is significantly important as they are heavily used in image, video, and other machine learning-based processing tasks which represent the primary use cases at edge devices. In some embodiments, the disclosed system largely reduces total compilation time while achieving better average performance when compared to dynamic profiled cost model approaches.

In some embodiments, the disclosed model compilation system 132 can be provided as part of a machine learning service 130 of a provider network 100, enabling model developers to optimize for inference at the edge. Using such a service 130, application developers can deploy DNN models optimized for inference in production on one or many types of edge devices. In some embodiments, the machine learning service 130 may also provide other machine learning related tasks, e.g., model training via a model training system 120, model hosting via a model hosting system 140, and the like.

A provider network 100 provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 106 (e.g., the internet) via one or more interface(s) 104, such as through use of application programming interface (API) calls, via a console implemented as a website or application, etc. The interface(s) 104 may be part of, or serve as a front-end to, a control plane 102 of the provider network 100 that includes "backend" services supporting and enabling the services that may be more directly offered to customers.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code—typically without the user having any control of or knowledge of the underlying compute instance(s) involved.

As shown at circle (1), a user 122 may utilize a client application 119 executed by a computing device 121 to interact with the machine learning service 130, e.g., via use of client application 119 such as a browser displaying a website, a special-purpose application, or the like. For example, the user 122 may navigate a web-based console client application 119 to request that a particular machine learning model is compiled and/or deployed to one or more edge devices 110A-110N. This request may be issued as one or multiple commands sent using one or more messages such as HTTP request messages transmitted to an endpoint associated with the machine learning service 130 or the provider network 100.

For example, the user 122 may use a user interface of the client application 119 allowing the user to provide details regarding a compilation job. The user 122 may provide information such as a compilation job name, an account role having sufficient permissions for accessing certain needed resources (e.g., a storage location of a storage service 124 storing model artifacts 126 of the involved ML model), an identifier of the location of the stored model artifacts 126 (e.g., a path or URI), an identifier of the shape of the data matrix (e.g., {"input": [1, 224, 224, 3]}), an identifier of a machine learning framework that the model was trained in (e.g., "TensorFlow" or "MXNet"), etc. The user 122 may also provide an identifier of a storage location where the compiled model is to be stored, and/or identifiers of one or more edge devices (e.g., an identifier of a group of devices, or identifiers of individual devices) and optionally an identifier of each hardware platform type of the one or more edge devices. Upon receipt of this information, the model compilation system 132 may obtain the model artifacts 126 (e.g., model architectural definition, model weights, etc.) using the storage location identifier at circle (2) and perform the compilation with optimization process disclosed herein at circle (3).

As discussed, model compilation system 132 can perform static analysis using a cost model to optimize the machine learning model for a particular hardware platform of the edge device(s) 110A-110N to which it is to be deployed. For example, during compilation, the model compilation system 132 converts the model, using the model artifacts obtained at circle (2), to an intermediate internal representation. Using this representation, the model compilation system 132 then imports the workloads associated with the model and queries workload database 160 to identify any optimizations that have previously been identified for these workloads. If a key of a given workload exists, then the model compilation system 132 fetches the value of it from the database 160 at circle (4). If an optimization for the workload does not already exist, then static analysis manager 162 can use an analytical cost model and search algorithm to identify an optimal implementation of the workload to be used for the edge device's hardware platform, at circle (5).

In some embodiments, the inputs to static analysis manager 162 are a tensor program e and a corresponding transformation space $T_e$. For a transformation $t \in T_e$, let $i=g(e,t)$ be the intermediate representation of the transformed tensor program. Low-level code (e.g., assembly, PTX, etc.) a is then generated. Hardware-based program feature(s) are then extracted via $pf=f(i,a)$. The final (e.g., optimized) program is calculated as $c(pf)$ using a cost model. This can be formalized as the following:

$$\underset{t \in T_e}{\operatorname{argmin}} \ c(f(g(e, t), a))$$

Some embodiments are built upon a deep learning compiler stack. This allows for the use of an existing tensor expression system, IR and code generator. However, such embodiments are enhanced using a hardware related cost model and a multi-threaded search algorithm. Existing search-based approaches fetch cost model features from a program IR which typically focus on high-level loop features, such as unrolling, vectorization, number of operations, etc. These high-level features do not consider hardware specifications which can have great impact on performance. To address this, embodiments analyze both the program IR and low-level generated code to extract target hardware related features, such as number of assembly instructions, CPU cache locality, GPU shared memory utilization, etc. With these low-level hardware features, the cost model is accurate enough to predict the relative performance for a set of transformations of a tensor program, rather than relying on experimental execution on real hardware devices. Additionally, the multi-threaded search algorithm can fully utilize multi-core CPU resources to accelerate searching. In some embodiments, evolution strategies may be used as the search algorithm. Evolution strategies is a parallel black-box optimization algorithm. The computation among each iteration of population can be executed simultaneously. With a multi-core CPU machine or a multi-machine compilation system, the total searching time can be significantly reduced to be fit into the normal compilation flow.

Thereafter, the model compilation system 132 may cause the compiled model(s) to be deployed to the edge device(s) 110A-110N at circle (6) and/or optionally stored to a same or different storage location provided by the storage service 124. The edge device(s) 110A-110N may store the model as model 123 in a memory 118, which may be executed in whole or in part by the GPU 112 and/or CPU 114 as disclosed herein. Thus, for example, the edge devices 110A-110N may generate sensor data 152 via sensing environmental aspects 150 via a sensor 116 (e.g., an image sensor capturing optical data such as a picture of a particular environment, a microphone capturing audio data such as a vocal command issued by a person in a nearby environment, etc.) and run inference with this sensor data 152 using the GPU 112 and/or CPU 114 to execute some or all of a ML model 123.

As introduced earlier, the integrated GPUs 112 may be mainstream integrated GPUs, such as those produced by Intel®, ARM®, Nvidia®, etc. These GPUs are on-die connecting to other agents within the same SoC such as CPU cores via a ring interconnect, and these GPUs commonly share the main memory with CPU cores. The integrated GPUs maintain several levels of hierarchical caches to reduce data latency, typically including register files and L1 and L2 caches. An efficient computation pattern will mostly use the data stored in the register files and hide the latency to retrieve data from farther memories.

The integrated GPUs process the computation using their compute units, which are called execution units (EUs) in Intel graphics, shader cores (SCs) in ARM Mali GPUs, and stream multiprocessors (SMs) in Nvidia GPUs. Each compute unit coordinates a certain number of hardware threads and each thread owns a certain amount of register files. According to the generation and the level of the integrated GPU, the number of compute units varies. Most of the modern integrated GPUs support Single Instruction Multiple Data (SIMD) instructions. An efficient computation pattern should keep all the available threads of all compute units busy for most of the time and utilize the SIMD instructions whenever possible.

Today, integrated GPUs target two similar programming models for general-purpose programmability, OpenCL and CUDA. Integrated GPUs on Intel and ARM devices normally support OpenCL as the driver and utilize its APIs to program, which is the most general-purpose program to run on these GPUs. On the other hand, Nvidia products run CUDA as its proprietary driver.

Despite significant differences in their details, OpenCL and CUDA share many similar abstractions. The modern integrated GPU is a massively parallel processor that supports hundreds of hardware scheduled threads running simultaneously. These threads are organized into blocks (OpenCL: workgroups) and the hardware schedules blocks of threads onto hardware cores (CUDA: streaming multiprocessors, OpenCL: compute units). Nvidia GPUs have on the order of 16 cores, each of which includes 32-wide SIMD processors (CUDA: CUDA cores, OpenCL: SIMD units) that run 32 threads in lockstep. GPUs also feature a memory hierarchy of per-thread registers, per-block shared memory (per-work-group local memory), and off-chip global DRAM accessible to all threads. CUDA programs (or "kernels") specify the number of blocks and threads per block under a SIMT (single-instruction, multiple-thread) programming model. GPU implementations typically launch a number of kernels during execution. A kernel is essentially a function, which can be instantiated into many instances to deal with different data specified by block indices. They achieve parallelization by running many kernel instances simultaneously, each of which is called a work item. In integrated GPUs, a work item corresponds to a SIMD entry, processed by a CUDA core (CUDA term) or a virtual thread (OpenCL term in Intel Graphics). Therefore, a warp (CUDA term) or hardware thread (OpenCL term in Intel Graphics) processes multiple work items at the same time, inherently implementing the SIMD vectorization. This programming model of CUDA and OpenCL is suitable for the compute pattern of neural networks. Efficient GPU programs should have enough work per kernel to keep all hardware cores busy (load balancing), strive to reduce thread divergence (when neighboring threads branch in different directions), aim to access memory in large contiguous chunks to maximize achieved memory bandwidth (coalescing), and minimize communication between CPU and GPU. Designing an implementation that achieves all of these goals is a significant challenge.

As introduced earlier herein, in order to utilize integrated GPUs well, chip vendors normally ship products with well-optimized high-performance libraries, e.g., clDNN for Intel graphics, ACL for ARM Mali GPUs, and cuDNN for Nvidia GPUs. These libraries take advantage of properties of CUDA/OpenCL described above to achieve good performance on GPUs. In addition, Intel extends the OpenCL driver to support some special features of their hardware platforms. For instance, the Intel extended OpenCL organizes the work items of the same hardware thread as a subgroup, which share the same register files of the hardware threads. These high-performance libraries target mostly on optimizing the computationally intensive tensor operators like convolution.

Embodiments improve DNN model performance on a variety of hardware platforms by optimizing compute intensive functions for the particular hardware platform on which the DNN model will execute. Prior systems have used a search-based approach for finding optimal transformations for these operators. However, search-based approach algorithms typically define a large search space to be searched. This requires picking up the points in the search space and compiling and then deploying to actual devices for testing. This is difficult to manage and requires a significantly long time to complete for a single model, which is compounded at scale. To address these drawbacks, embodiments perform static analysis based on hardware features. This includes a cost model specific to a hardware platform. For example, one cost model may be created for an Nvidia GPU platform, while different cost models may be created for Intel and ARM CPU platforms. Each of these cost models are tailored to the specific hardware features of their corresponding platforms. When a DNN model is being optimized for a particular platform, the cost model associated with that platform is used to predict the performance of the operators in the search space.

This enables DNN models to be optimized for different platforms without requiring the service provider to maintain a whole compilation and deployment pipeline for the sole purpose of optimizing to a single platform. Additionally, at compile time the service provider does not need a real device for optimization. This is helpful for customers who may not be willing or able to provide their device during the optimization process. In some embodiments, for CPU architectures, the cost model can include a number of compute intensive instructions in the AVX instruction set, cache locality, which is roughly the number of L1 cache miss in the program, instruction level parallelization, and thread level parallelization. These factors may be tailored to different vendor platforms (e.g., Intel, Arm, etc.). For GPU architectures, the cost model may include shared memory load and parallelization.

Figure 2:
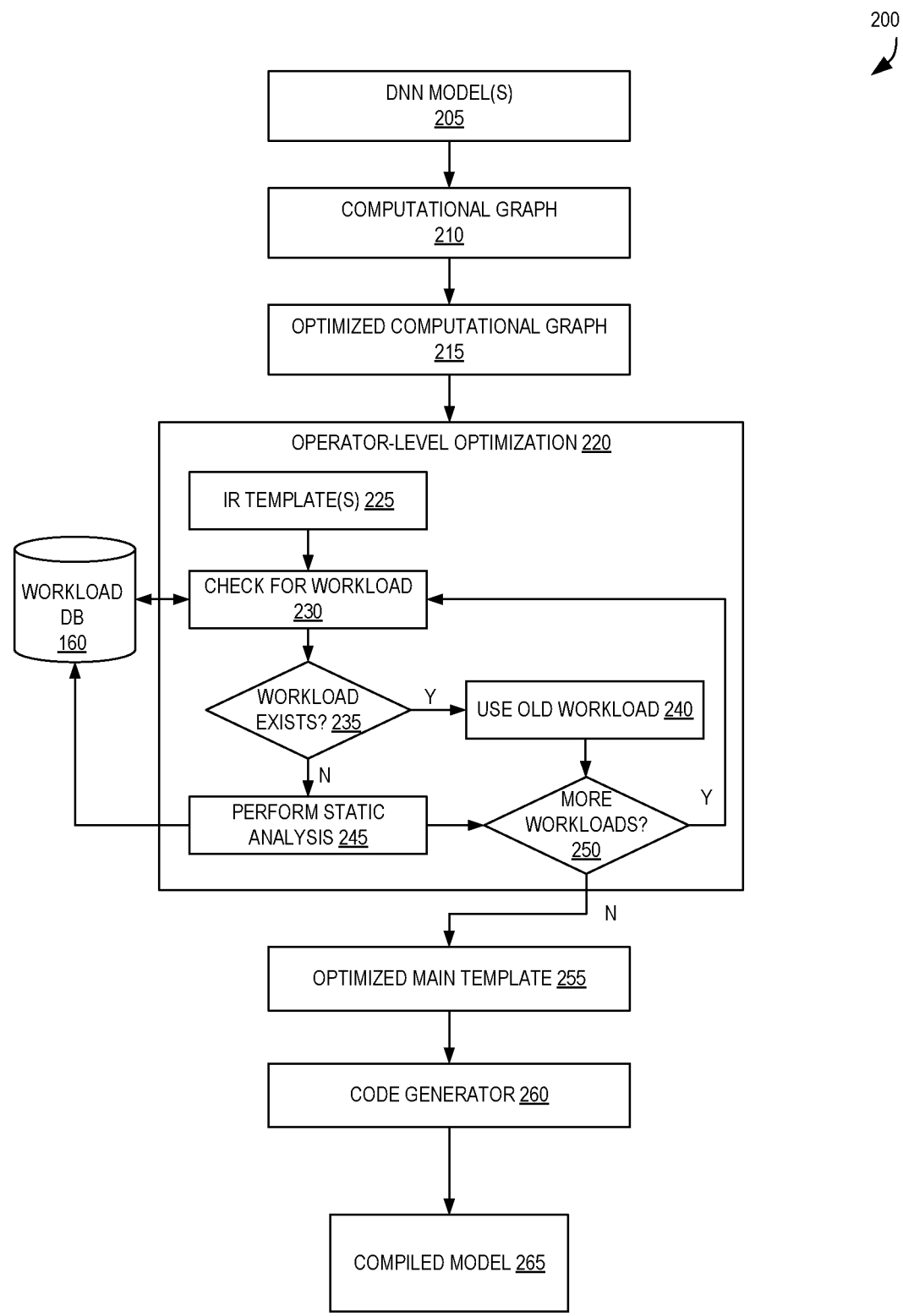
FIG. 2 is a diagram illustrating operations for optimizing deep neural network models for inference using static analysis according to some embodiments.

An overview of operations 200 the compilation and optimization pipeline according to some embodiments is shown in FIG. 2, which may be executed by the model compilation system 132 of FIG. 1. A DNN model 205 is obtained (e.g., model artifacts from a storage service) and used to build a computational graph 210 (e.g., an intermediate representation) using techniques known to those of skill in the art, in which the nodes of the graph correspond to operators to be performed. Optionally, the computational graph 210 may be optimized via a first pass using known general ML model optimization techniques, e.g., by a deep learning compiler stack, to create optimized computational graph 215.

In some embodiments, a set of operator-level optimizations 220 are applied. For example, a set of hardware platform-optimized IR templates 225 that specify how to efficiently execute compute-intensive operators may be used to define more efficient processes for the ML model. DNN operators normally act on top of tensors (e.g., n-dimensional arrays). Hand-written schedule/optimization libraries, e.g., cuDNN, MKL-DNN, etc., from hardware vendors have been widely used to deliver compelling performance. However, each vendor may provide their own proprietary library with optimized performance on a certain number of kernels. That is, programmers may have to sort out the best combination of various kernel implementations, which also requires significant engineering efforts and domain knowledge of each kernel from each vendor. An optimization engine of an existing deep learning compiler stack (e.g., the AutoTVM feature of the TVM compiler stack) provides a venue that automatically optimizes common tensor operators for given hardware platform and builds up an optimization space composing possible transformed versions of tensors. Both hardware and software related factors are considered when constructing a low-level transformed program. For example, the typical ones are unrolling factor, thread binding, and vectorization capabilities, etc. Users may then provide limited parameters (via templates) to explore the search space based on statistical cost models for predicting achievable performance results. In some embodiments, such a tool (e.g., AutoTVM) is utilized to search for scheduling schemes that lead to good performance of convolutions based on the templates (e.g., code or definitions including parameters that can be modified) constructed for compute-intensive operators. As tensor-level search is costly—particularly at the edge devices due to their limited compute capability—embodiments can prevent replicated searching by maintaining a database to store the results for every convolution workload on each hardware platform.

For example, as shown in FIG. 2, the workload database 160 can be checked 230 for optimizations that have already been found for a particular workload. In some embodiments, a workload may refer to a particular operator and its input shape (e.g., number of inputs, type of inputs, size of inputs, etc.). If the optimized schedule for the workload exists 235 then the optimized schedule previously found for that workload, and stored in workload database 160, is used 240. If the optimized schedule does not already exist in the workload DB 160, then static analysis manager 162 is used to perform static analysis 245 using a cost model based on the hardware platform to which the DNN is to be deployed. Static analysis then identifies the optimized schedule for the workload. In some embodiments, this optimized schedule for the workload is then stored in workload DB 160 for use on future matching workloads. If additional workloads exist 250, then the process continues for each remaining workload. If not, then the processing continues as shown. Embodiments may identify optimized schedules for the workloads of a given DNN in sequence or in parallel depending on implementation.

At this point, an optimized main template 255 is created that, in an intermediate representation serving as an execution plan, can be translated/complied by a code generator 260 to generate one or multiple types of code for the target hardware platform. As indicated with regard to FIG. 1, these model(s) can be stored at a storage location, transmitted to another system, deployed to edge devices, etc.

Figure 3:
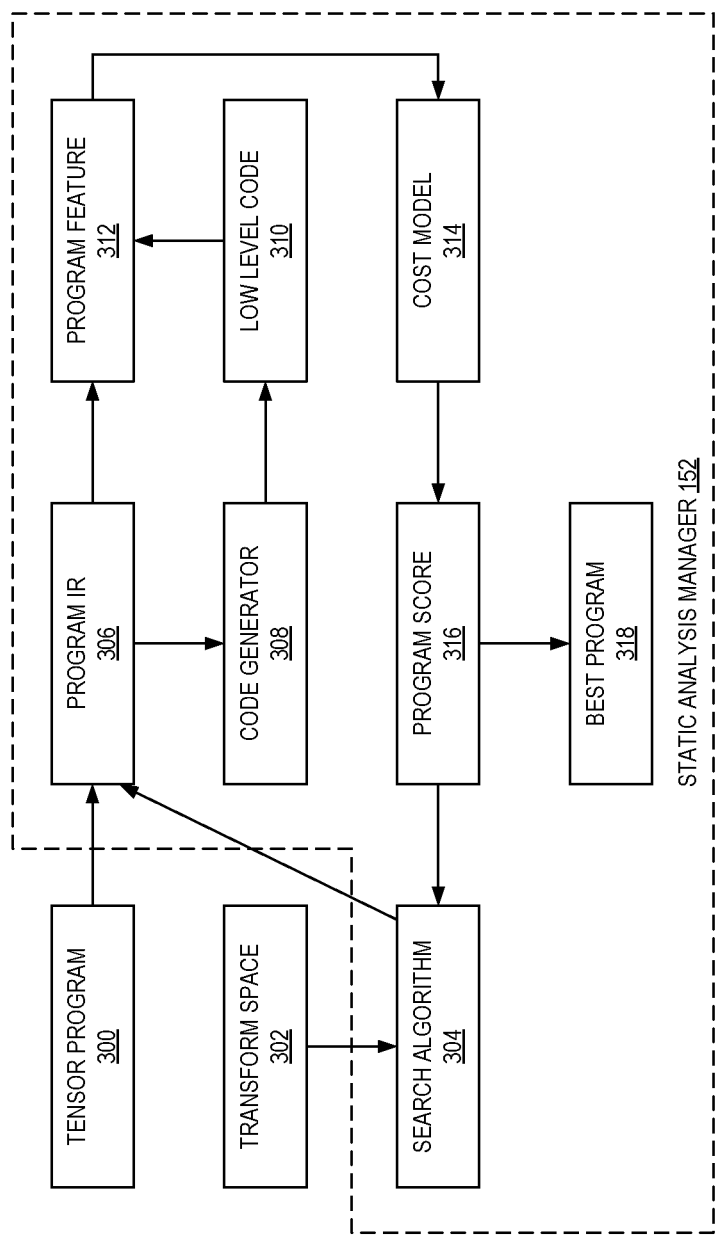
FIG. 3 is a diagram illustrating static analysis performed on a tensor program according to some embodiments.

FIG. 3 is a diagram illustrating static analysis performed on a tensor program according to some embodiments. As discussed above, in some embodiments, the inputs to static analysis manager 162 are a tensor program e 300 and a corresponding transformation space $T_e$ 302. The program intermediate representation (IR) 306 is then generated using one or more transformations from the transformation space 302. For a transformation $t \in T_e$, let $i = g(e,t)$ be the intermediate representation 306 of the transformed tensor program 300. The program IR 306 is provided to code generator 308. Code generator 308 generates low-level code (e.g., assembly, PTX, etc.) a 310 from the program IR 306. Hardware-based program feature(s) 312 are then extracted from the program IR 306 and the low-level code 310. This may be expressed as $pf = f(i,a)$. The program features 312 are then provided to cost model 314 which is specific to the hardware platform to which the DNN model will be deployed. A program score 316 is determined using the cost model and provided back to the search algorithm 304. Once the transform space 302 has been evaluated using the cost model, the optimized program 318 is output once the transformation space 302 has been evaluated using the cost model. In some embodiment, the entire transformation space is evaluated before the optimized program is output. Alternatively, only a portion of the transformation space is evaluated.

The search algorithm 304 is used to search the transform space 302. The transform space 302 is a well-defined large search space including various transformations that may be used for operators in tensor program 300. In some embodiments, the search algorithm is Evolution Strategies (ES), and the search is treated as an arbitrary black-box optimization problem. ES works by treating the model of interest as an arbitrary optimization problem. Given parameters of the model and the associated performance of that model on the task of interest, ES is able to optimize and train the model without any knowledge of the structure or architecture of the model itself. Specifically, at each iteration, random gaussian noise is added to the parameters to generate slight variations of the current model. Each variation is then tested for performance on the task of interest. Finally, a weighted sum is taken, based on performance, to generate an updated model. This becomes the current model for the next iteration. In standard ES, the performance of the model within its environment as a black-box optimization problem. Embodiments extend this concept to treat ES itself as a black-box optimization problem with respect to the learning rate $\alpha$ and standard deviation of noise $\sigma$.

Listing 1 : Search Algorithm

Input: Learning rate $\alpha$, noise standard deviation $\sigma$,
  initial policy parameters $\theta_0$ for $t = 0, 1, 2, \ldots$ do—Sample$\varepsilon_1$,
  $\ldots$ , $\varepsilon_n \sim \mathcal{N}(0, 1)$ Compute returns $F_i = F(\theta_t + \sigma \varepsilon_i)$ for $i = 1$,
  $\ldots$ , $n$  Set $\theta_{t+1} \leftarrow \theta_t + \alpha \frac{1}{n\sigma} \sum_{i=1}^{n} F_i \varepsilon_i$ In the above search algorithm, F denotes an objective function working with parameters θ.

As discussed, an analytical cost model 314 is used to predict tensor program performance. Embodiments extract a series of hardware related features, $f_0, f_1, \ldots, f_n$, which contribute to a deep learning tensor program's performance. These features can fall into two categories: related instructions and general hardware features.

For related instructions, embodiments count the number of hardware instructions which most significantly contribute to tensor program performance. For example, in some embodiments, the cost model factors in arithmetic and data movement instructions. As shown in FIG. 2, embodiments jointly parse high-level program IR and low-level code to get an accurate estimation of instruction numbers. For general hardware features, hardware features such as cache locality and instruction level parallelism, have a significant impact to program performance. These features may also be extracted from program IR and assembly codes.

The performance score is computed linearly with respect to the features:

score=$a_0 * f_0 + a_1 * f_1 + \ldots + a_n * f_n$

The coefficients $a_0, a_1, \ldots, a_n$ are generated for each hardware architecture through hardware instruction latency and empirical profiling data.

Embodiments are generic enough to support different hardware architectures. For example, in some embodiments cost models may be provided for Intel CPU, ARM CPU, and Nvidia GPU architectures. In some embodiments, the same cost model may be used across micro architectures (e.g., architectures which share the same set of SIMD/SIMT instructions). These cost models will be furth discussed below.

The CPU cost model can include a number of factors which influence inference performance of deep learning programs when executed on modern CPU architectures. Such factors may include the number of SIMD assembly (or other low-level code) instructions, an estimation of L1 cache misses, and instruction level parallelism. Compute-intensive tensor program performance is dominated by vectorize arithmetic and data movement instructions. For the Intel AVX instruction set, vfmadd and vmov are the most common instructions in conv2d and dense operators, while for AARCH64 Neon fmla, ld and st are used. Embodiments parse the program IR and assembly codes to get the total number of these significant SIMD instructions. Cache locality is a key factor for tensor program performance when executing on a CPU architecture. An analytical method may be used to estimate L1 cache miss for a given program IR. Additionally, instruction level parallelism is also evaluated to determine how well the CPU pipeline is utilized.

As discussed, the number of SIMD instructions can be determined using the program IR and the low-level code. Program IR represents the transformed tensor program in a high-level pattern, which preserves the complete loop structures. However, the actual SIMD instruction arrangement is typically opaque in high-level program IR, due to optimizations done in the code generation process, such as register allocation and superword-level parallelism vectorization. On the other side, low-level assembly codes provide detailed instruction information in each basic block. However, it is difficult to restore original loop structure from an assembly control-flow graph. As such, it is infeasible to extract instruction information solely from either program IR or assembly code.

Instead, embodiments jointly parse high-level program IR and low-level assembly code. This allows for the extraction of full loop information from program IR and low-level instruction number from assembly code. Pattern matching is executed to match loop bodies with assembly basic blocks and calculate a total number of SIMD assembly (or other low-level code) instructions.

Listing 2 shows a procedure of joint parsing in accordance with some embodiments. Loop blocks are extracted from the program AST with pre-order depth-first search. From the assembly control flow graph, a local basic block is identified as a loop candidate with the following condition: traversing from top to bottom of assembly code, there exists a jump instruction j targeting a basic block $LBB_x$, and the position of $LBB_x$ is above j. Each pair of loop and basic block are then matched by checking whether they have the same iteration boundary. For a matched basic block, we count the number of selected SIMD instructions. Finally, the system calculates the total number of SIMD assembly (or other low-level code) instructions for every loop block in program IR.

1 Loop-Map(IR, assembly)
  2 ForLoops=Preorder-DFS-For-Loop(IR)
  3 LoopLBBs=Identify-Loop-LBB(assembly)
  4 matchedIdx=0
    matchedLBBs=[ ]
  6 for each basicBlock in LoopLBBs do
  7 forLoop=ForLoops[matchedIdx]
  8 if Pattern-Match-Loop(forLoop, basicBlock) then
  9 matchedLBBs.append(basicBlock)
  10 matchedIdx+=1
  11 return
     Count-Instruction(ForLoops;matchedLBBs)

Listing 2: Technique for Mapping Program IR and Assembly Code

Cache performance is another important feature for modeling deep neural network performance when executed on a CPU. Embodiments provide an improved analysis model that can evaluate relative data movement on imperfect-nested loops, which enables analysis to be performed on TVM-optimized TIR of full pipelines. A static and analytical method is used to predict the cache performance of a given TVM TIR on a given cache specification. The prediction score provides a fast approximation of the relative cache miss for all TIR candidates. Although embodiments are described with respect to TVM, embodiments may also be used with other machine learning compiler frameworks.

Figure 4:
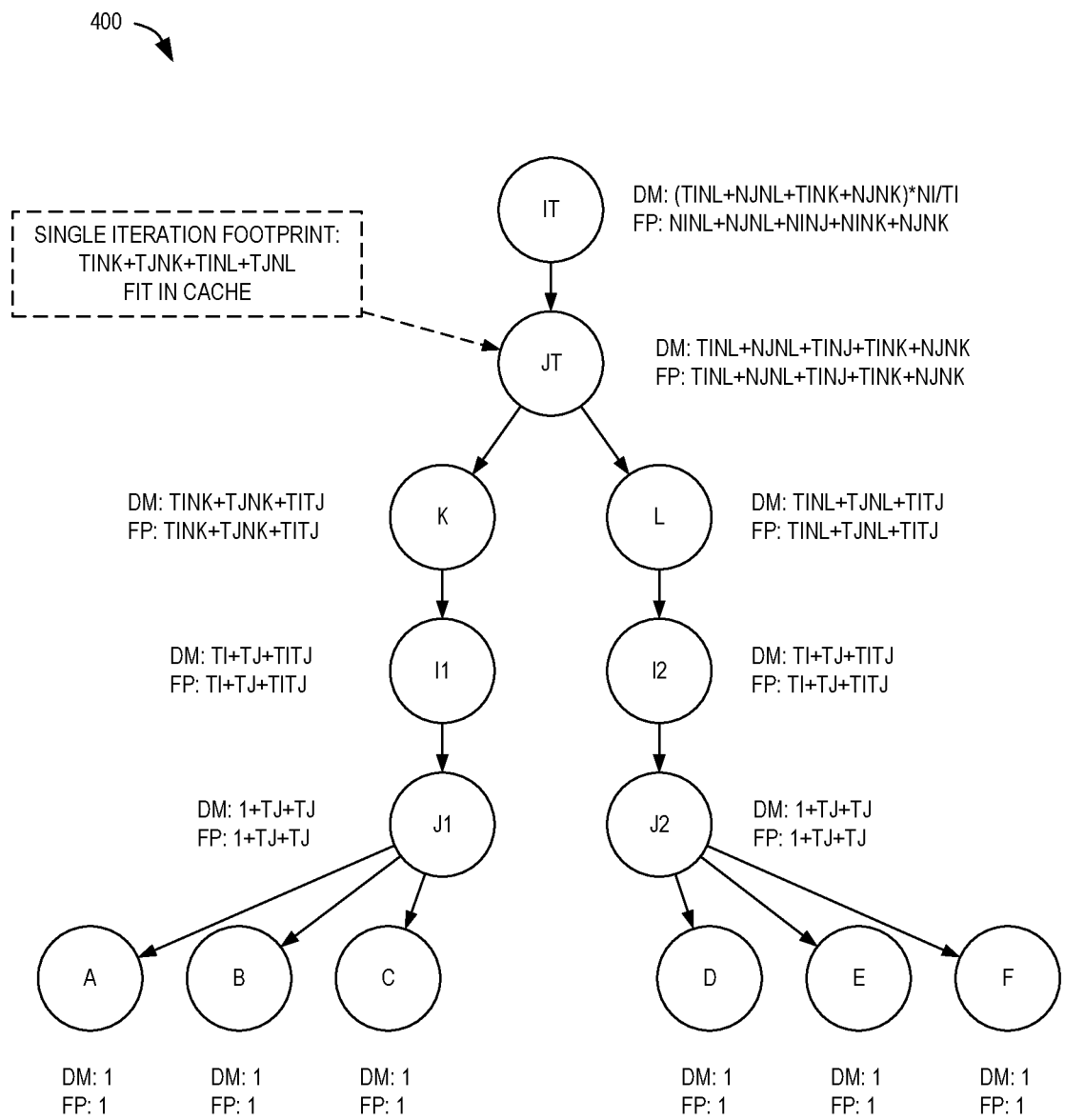
FIG. 4 is a diagram illustrating loop structure and data movement of a two matrix multiply operator according to some embodiments.

FIG. 4 is a diagram illustrating loop structure and data movement of a two matrix multiply operator according to some embodiments. One aspect of modeling cache performance is to characterize the data footprint and data movement required to move data into the cache of the object code. The object code can be abstracted as a tree that includes loop-nodes and access-nodes. All loop-nodes are non-leaf nodes and carry the information of a loop statement. All access nodes are leaf nodes that represent either a tensor load access or a tensor store access. The data footprint and data movement are calculated by traversing the bottom to the top of the tree.

The example of FIG. 4 uses a 2MM (Two Matrix Multiply) as an example to demonstrate the method for building data movement. The data movement value for a given program is recursively determined from the leaf nodes to the root node. The following listing shows an example of fused and tiled 2MM code.

---
Listing 3: Fused and tiled two matrix multiplication
---
```
/ /Ni/Nj/Nk are perfect multiples of Ti/Tj/Tk
for(it=0; it<Ni; it+=Ti)
  for(jt=0; jt<Nj; jt+=Tj)
    for (k=0; k<Nk; k++)
      for (i1=0; i1<Ti; i1++)
        for (j1=0; j1<Tj; j1++)
          C[i+it] [j+jt] +=
            A[i+it] [k] *B[k] [j+jt];
      for (l=0; l<Nl; l++)
        for (i2=0; i2<Ti; i2++)
          for (j2=0; j2<Tj; j2++)
            E[i+it] [l] +=
              C[i+it] [j+jt] *D [j+jt] [l]
```

In this example the first Matmul uses i and j as free indices and performs contraction over k. The second Matmul uses i and l as free indices and performs contraction over j. The tiling loop of i and j are tiled and fused together, and other loops are non-tiled and non-fused. The cache capacity and values of all tile-size and problem size are known before the analysis starts.

Assuming the cache capacity S is enough to store all data footprints below tiling loops, and is not enough to store data footprints of any tiling loop. This means Ni>S and Nj>S, but S>TiTj+TiNl+TjNl+TjNk+TiNk.

The data footprint and data movement are computed from the leaf nodes to the root of the tree. Since all leaf nodes are tensor accesses, the footprint (FP) and data movement (DM) for leaf nodes (e.g., leaf nodes A-F) are both 1, as shown in FIG. 4. The data footprint of a loop node is the number of distinct data elements accessed during all iterations of this loop. The data movement of a loop node is calculated based on its footprint and cache capacity. If the footprint of a single loop iteration is smaller than cache capacity, the data movement of this loop node is equal to its node footprint. Otherwise, the data movement of this loop node is evaluated as product of the number of iterations and the data movement of its single iteration. The data movement of single iteration is correlated to data movement of sub nodes, which is computed earlier in the bottom-up procedure.

In the 2MM example, based on the capacity assumption, the footprint of a single iteration of loop jt is TiTj+TiNl+TjNl+TjNk+TiNk which fits in the cache. For all sub-loop nodes of jt, the data movement is equal to the data footprint. For loop jt, since its single iteration footprint fits in the cache, when the control flow goes to the next iteration, tensor A and E could be reused because their access functions do not include index jt. Therefore, the data movement of loop jt is TiNj+TiNl+NjNl+NjNk+TiNk, which is still equal to its footprint. However, for loop it, even a single iteration's footprint does not fit in the cache. As such, the data movement of loop it will be the product of number of iterations and data movement of a single iteration, which is (TiNj+TiNl+NjNl+NjNk+TiNk)*Ni/Ti.

Listing 4 shows the main procedure of visiting each node in the TIR node tree. Access nodes are processed at Line 2, and loop nodes are processed starting at line 4. When visiting a loop node, the algorithm first recursively visits all its children at line 6 and computes the joint data space of a single iteration. The algorithm will then detect whether the joint data space can fit in the cache at lines 10 and 19. If the data fits in the cache, the data movement calculation is straight-forward. Otherwise, the algorithm will check each tensor and its access expression and decide the reuse status and the required data movement. In some embodiments, operations related to integer points set or relation are implemented by using an Integer Set Library. The data movement value determined for the program is then used in the cost model, as discussed.

---
Listing 4: Technique for modeling data movement at each TIR tree node
---
```
Visit-Node (node, cache)
  if node is AccessNode then
    return Dmov=1, Dfp=1, DataSpace
  else if node is LoopNode then
    subDspace, subDfp, subDmov = [ ]
    for each childNode do
      dspace, dfp, dmov = Visit-Node (childNode, cache)
      append dspace, dfp, dmov to subDspace,
        subDfp, subDmov
    DataSpace = Create-IntegerSet (subDspace)
    if DataSpace.cardinality > cache then
      Dmov = 0
      for each tensor ts do
        get ts.dmov, ts.dspace, ts.expr from
          subDmov, subDspace
        if ts.reuse is True then
          Dmov +=
            Estimate-Dfp (node.iterVar,
              ts.dspace)
            Update-Reuse-Status (ts)
        else
          Dmov += ts.dmov * node.tripcount
      return Dmov, Dfp=DataSpace.cardinality, DataSpace
    else
      return Dmov=Dfp,
        Dfp=DataSpace.cardinality, DataSpace
```

Returning to FIG. 3, modern CPUs utilize pipelines and out-of-order execution to increase the instruction level parallelism (ILP) and hide latency. Therefore, to achieve high performance, the generated assembly code should allow the processor to issue as many instructions as possible to keep the pipeline busy. As such, the cost model 314 further needs to estimate the instruction level parallelization efficiency.

In some embodiments, the cost model uses a simplified fast out-of-order instruction scheduler that schedules instructions in each basic block. The scheduler includes a data dependency builder and an instruction scheduler. The data dependency builder first scans the whole basic block and creates two instruction dependency graphs, one for true dependency and one for false dependency. Then the instruction scheduler schedules the instructions based on the dependency graph and hardware specifications such as instruction latency and number of different processing units. During the scheduling, a timestamp is assigned to each instruction, indicating the time at which the instructions started executing. The first ready-to-execute instruction is scheduled at cycle zero, and total cycles required for finalizing all instructions is used as the ILP cost of this basic block. Embodiments calculate the product of ILP cost and number of executions for a single basic block, and add these products of all of the basic blocks. The summation is used as the ILP cost of the whole program.

During the scheduling, the scheduler manages two different hazards: a structural hazard and a data hazard. The structural hazard is controlled by limiting a maximum number of instructions issued at each cycle. If the maximum number of issued instructions reaches the number of processing units, the next instruction to be issued is delayed to the next cycle. The data hazard is identified by analyzing the dependency graph. If there is a read-after-write (RAW) dependency between two instructions, the consumer instruction is scheduled after the producer instruction finishes execution. If there is a write-after-read (WAR) dependency or write-after-write dependency, the latter instruction which writes to the resource cannot be scheduled before the prior instruction.

In the above-described examples, a tensor program is optimized to run on a CPU architecture (e.g., Intel- or ARM-based CPU architecture) using a CPU architecture-specific cost model. As discussed, the cost model factors in the number of SIMD assembly (or other low-level code) instructions, an estimation of L1 cache misses, and instruction level parallelism. A score is calculated by multiplying each factor by a corresponding coefficient which may vary depending on the observed performance of the hardware architecture (e.g., based on hardware instruction latency, empirical profiling data, etc.). Embodiments may also be used to optimize a tensor program to run on a GPU architecture using a GPU-specific cost model. For example, when optimizing for a GPU architecture, cost model 314 can factor in the number of PTX instructions and instruction level parallelism. For instance, for the CUDA PTX instruction set, fma, ld and st are the most common instructions in conv2d and dense operators, where the clock cycles per instruction differs by memory type. The program IR 306 and low-level code 310 can be parsed to determine the total number of these instructions. This may be performed as discussed above with respect to the CPU cost model.

Additionally, instruction level parallelism can be determined by determining the efficiency of a kernel in a single thread and how it utilizes available GPU resources. In some embodiments, instruction level parallelism can be determined by extracting the latency of the operators and determining how many threads and how many blocks the code includes. For specific hardware, embodiments determine a total number of streaming multiprocessors in that hardware and the total number of threads that can be presented in each block. Using these numbers, the number of warps present in the code are determined as well as the theoretical maximum number of warps per streaming multiprocessor. By comparing these numbers, the instruction level parallelism is determined. Thread instructions are executed sequentially, so executing other warps is the only way to hide latencies and keep cores busy. They are limited by resource usage such as registers and shared memory. The following features are used to describe instruction level parallelization performance: workload per thread, streaming multiprocessor usage, single block resource utilization, and bank conflict.

The total number of PTX instructions is determined using loop structure mapping, similar to the process described above with respect to the CPU cost model. This is performed by mapping loops in the IR to the low-level code to determine the number of matching instructions. In the GPU architecture use case, this corresponds to the number of PTX instructions in the tensor program. Using the total number of PTX instructions, the workload per thread is calculated based on the map of instruction and a total number of cycles. The workload per thread is represented by total number of cycles.

In some embodiments, the streaming multiprocessor usage is determined using a number of rules. In some embodiments, to achieve the best performance, the following rules are defined: number of blocks≥number of streaming multiprocessors. As a result, all streaming multiprocessors have at least one block to execute. This is limited by resource usage which can be determined by using total registers counts divided by number of threads divided by registers used and total shared memory available divided by shared memory used in one block. To determine single block resource utilization, the number of registers and shared memory usage per block can be obtained. With this usage data, a number of threads that can be run concurrently within a block can be determined and from this the number of warps per streaming multiprocessor can be determined. In some embodiments, bank conflict is also used to determine instruction level parallelism. For example, in some modern Nvidia GPUs (e.g., compute capability >=5.0), shared memory has 32 banks that are organized such that successive 32-bit words map to successive banks. Each bank has a bandwidth of 32 bits per clock cycle and any shared memory load or store of n addresses that spans n distinct memory banks can be served simultaneously, yielding an effective bandwidth that is n times as high as the bandwidth of a single bank. However, if multiple addresses of a memory request map to the same memory bank, the accesses are serialized. The hardware splits a memory request that has bank conflicts into as many separate conflict-free requests as necessary, decreasing the effective bandwidth by a factor equal to the number of separate memory requests. The one exception here is when multiple threads in a warp address the same shared memory location, resulting in a broadcast. In this case, multiple broadcasts from different banks are coalesced into a single multicast from the requested shared memory locations to the threads. To incorporate the effect of bank conflict, embodiments first numerically evaluate the shared memory access indices of all threads in the first warp from the IR to compute the actual shared memory throughput. Then the ratio between actual shared memory throughput and requested shared memory throughput is used to adjust the number of shared memory operations The cost model then uses the resulting value for the number of PTX instructions and the value representing instruction level parallelism and generates a score. As discussed, the score is determined by multiplying these values by corresponding coefficients that are specific to the hardware platform for which the model is being optimized and summing the terms. The transform space continues to be searched and scored until the optimal program is identified (e.g., the program having the highest score).

Figure 5:
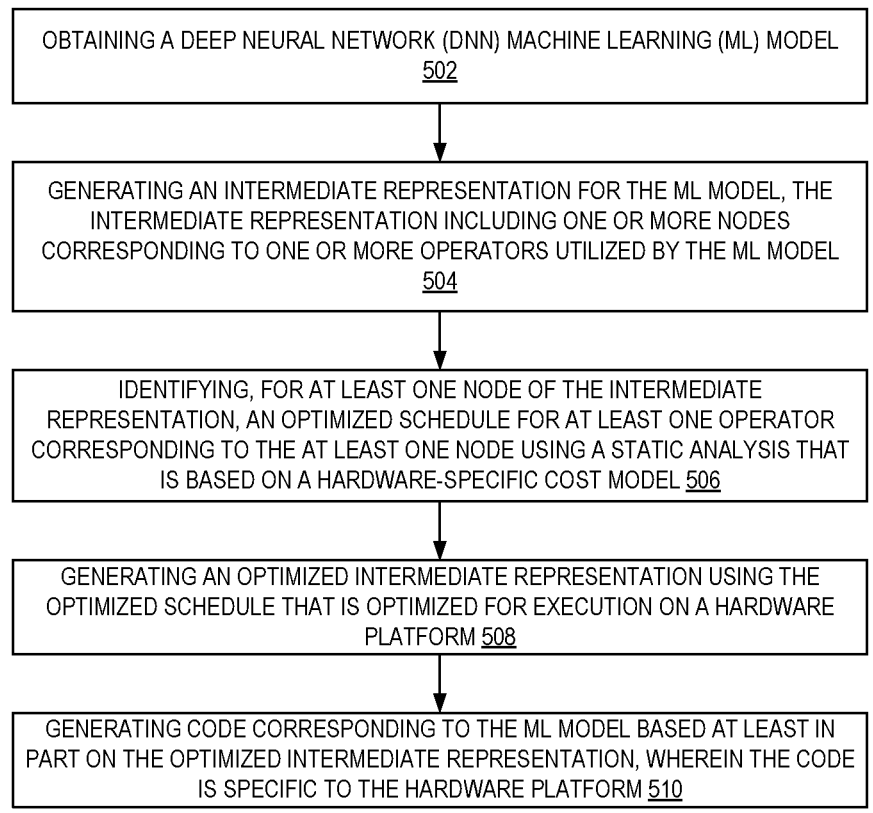
FIG. 5 is a flow diagram illustrating operations of a method for optimizing and deploying deep neural network models for inference using static analysis according to some embodiments.

FIG. 5 is a flow diagram illustrating operations 500 of a method for optimizing and deploying deep neural network models for inference using static analysis according to some embodiments. Some or all of the operations 500 (or other processes described herein, or variations and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some embodiments, one or more (or all) of the operations 500 are performed by at least machine learning service 130 of the other figures.

The operations 500 include, at block 502, obtaining a deep neural network (DNN) machine learning (ML) model. In some embodiments, the ML model is an image classification model, an object detection model, an image segmentation model, or a natural language processing model.

The operations 500 further include, at block 504, generating an intermediate representation for the ML model, the intermediate representation including one or more nodes corresponding to one or more operators utilized by the ML model. In some embodiments, the intermediate representation is a computational graph that represents the ML model/tensor program.

The operations 500 further include, at block 506, identifying, for at least one node of the intermediate representation, an optimized schedule for at least one operator corresponding to the at least one node using a static analysis that is based on a hardware-specific cost model. In some embodiments, identifying an optimized schedule further includes generating a plurality of scores for a plurality of schedules for the at least one node of the intermediate representation using the hardware-specific cost model, the hardware-specific cost model including terms corresponding to different features of the hardware platform, and identifying the optimized schedule based on the plurality of scores using a parallel black box search algorithm. In some embodiments, identifying an optimized schedule further includes extracting one or more hardware features based at least on the intermediate representation and the code corresponding to the ML model, determining a number of hardware instructions based at least on the intermediate representation and the code corresponding to the ML model, and generating the plurality of scores using the hardware-specific cost model, the one or more hardware features, and the number of hardware instructions. In some embodiments, each term of the hardware-specific cost model is associated with a coefficient associated with the hardware platform.

In some embodiments, determining a number of hardware instructions based at least on the intermediate representation and the code corresponding to the ML model, further comprises identifying one or more loop structures in the intermediate representation, identifying one or more corresponding blocks of the code corresponding to the ML model that match the one or more loop structures, and counting a number of hardware instructions in the matching one or more corresponding blocks of the code. In some embodiments, the hardware instructions include single instruction multiple data (SIMD) assembly code instructions or parallel thread execution (PTX) instructions.

In some embodiments, extracting one or more hardware features based at least on the intermediate representation and the code corresponding to the ML model further comprises identifying a plurality of loop nodes in the intermediate representation, determining a data movement and data footprint for each loop node from the plurality of loop nodes, and determining a cache localization feature based on the data movement and data footprint for each loop node. In some embodiments, extracting one or more hardware features based at least on the intermediate representation and the code corresponding to the ML model further comprises estimating parallelization efficiency using a parallelization model that simulates instruction level parallelization for each block of the code corresponding to the ML model. In some embodiments, extracting one or more hardware features based at least on the intermediate representation and the code corresponding to the ML model further comprises determining a workload per thread, determining a streaming multiprocessor usage, and determining a single block resource utilization.

The operations 500 further include, at block 508, generating an optimized intermediate representation using the optimized schedule that is optimized for execution on a hardware platform. In some embodiments, the optimized intermediate representation is generated by adding the optimized schedule to the intermediate representation. In some embodiments, the optimized intermediate representation is generated by additionally, or alternatively, adding an optimized schedule identified from a workload database, where the optimized schedule was previously identified as being optimized for a particular workload (e.g., operator, hardware platform, input shape, etc.)

The operations 500 further include, at block 510, generating code corresponding to the ML model based at least in part on the optimized intermediate representation, wherein the code is specific to the hardware platform. As discussed, this code may include low-level code such as assembly.

In some embodiments, the operations include receiving, at an interface of a multi-tenant provider network, a request to deploy a deep neural network (DNN) type machine learning (ML) model to one or more edge computing devices utilizing a hardware platform, the request including an identifier of the ML model or a storage location of the ML model within the provider network, obtaining the ML model from the storage location, generating an intermediate representation for the ML model, the intermediate representation including one or more nodes corresponding to one or more operators utilized by the ML model, generating a plurality of scores for a plurality of schedules for at least one node of the intermediate representation using a linear cost model, the linear cost model including terms corresponding to different hardware features of the hardware platform, identifying, for the at least one node of the intermediate representation, an optimized schedule for at least one operator corresponding to the at least one node based on the plurality of scores, generating an optimized intermediate representation using the optimized schedule, generating code corresponding to the ML model based at least in part on the optimized intermediate representation, wherein the code is specific to the hardware platform, and transmitting the code for deployment to the one or more edge computing devices.

In some embodiments, the linear cost model is a CPU cost model and wherein the terms include at least one of a number of single instruction multiple data (SIMD) instructions, an estimate of L1 cache miss, or instruction level parallelism. In some embodiments, the linear cost model is a GPU cost model and wherein the terms include at least one of a number of parallel thread execution (PTX) instructions or instruction level parallelism.

Figure 6:
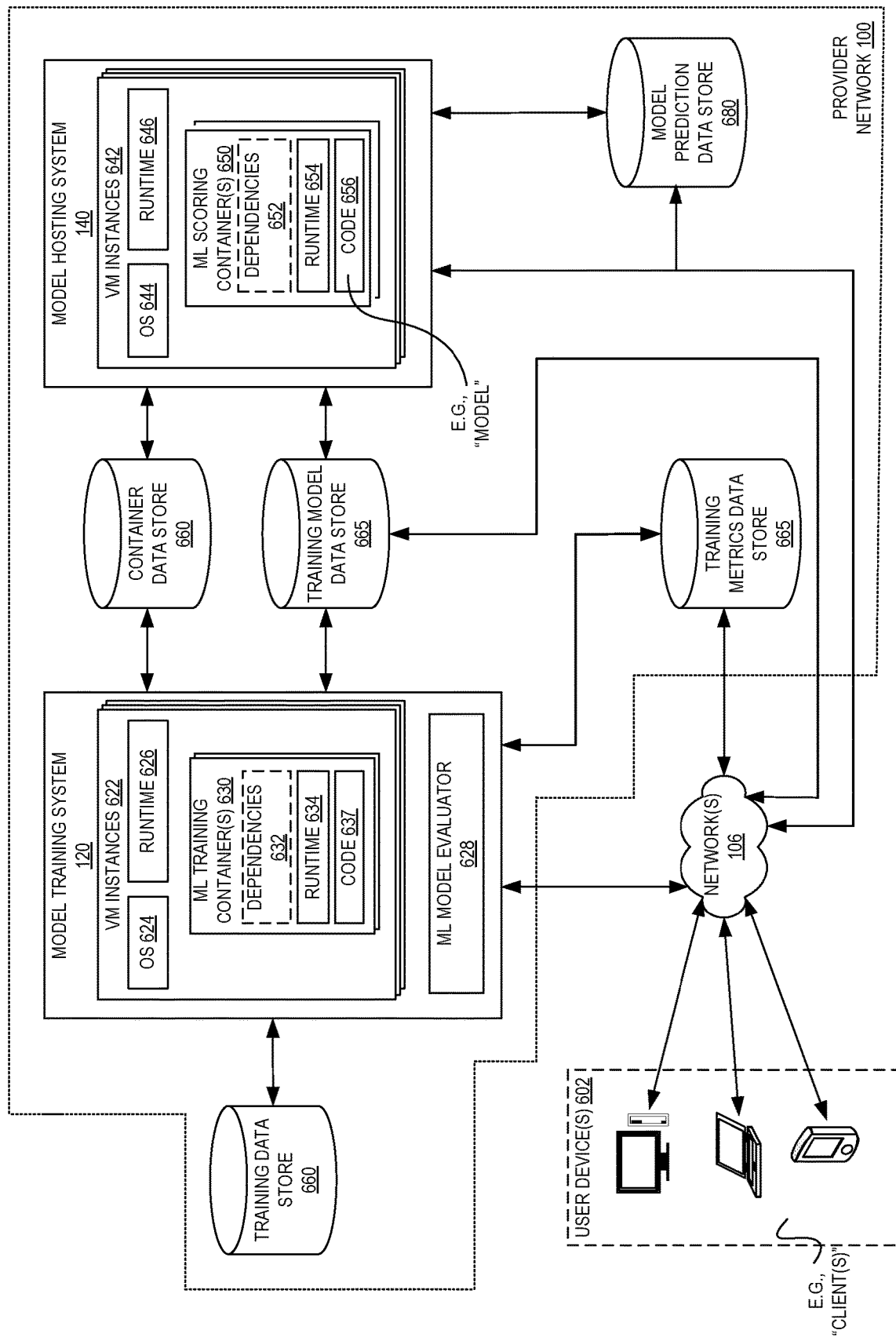
FIG. 6 is a block diagram of an illustrative operating environment in which machine learning models are trained and hosted according to some embodiments.

FIG. 6 is a block diagram of an illustrative operating environment in which machine learning models are trained and hosted according to some embodiments. The operating environment includes end user devices 602 (for example, computing devices(s) 121, edge device(s) 110), a model training system 120, a model hosting system 140, a training data store 660, a training metrics data store 665, a container data store 670, a training model data store 675, and a model prediction data store 680.

A machine learning service 130 described herein may include one or more of these entities, such as the model hosting system 140, model training system 120, and so forth.

In some embodiments, users, by way of user devices 602, interact with the model training system 120 to provide data that causes the model training system 120 to train one or more machine learning models, for example, as described elsewhere herein. A machine learning model, generally, may be thought of as one or more equations that are "trained" using a set of data. In some embodiments, the model training system 120 provides ML functionalities as a web service, and thus messaging between user devices 602 and the model training system 120 (or provider network 100), and/or between components of the model training system 120 (or provider network 100), can use HTTP messages to transfer data in a machine-readable file format, such as eXtensible Markup Language (XML) or JavaScript Object Notation (JSON). In some embodiments, providing access to various functionality as a web service is not limited to communications exchanged via the World Wide Web and more generally refers to a service that can communicate with other electronic devices via a computer network.

The user devices 602 can interact with the model training system 120 via frontend 629 of the model training system 120. For example, a user device 602 can provide a training request to the frontend 629 that includes a container image (or multiple container images, or an identifier of one or multiple locations where container images are stored), an indicator of input data (for example, an address or location of input data), one or more hyperparameter values (for example, values indicating how the algorithm will operate, how many algorithms to run in parallel, how many clusters into which to separate data, and so forth), and/or information describing the computing machine on which to train a machine learning model (for example, a graphical processing unit (GPU) instance type, a central processing unit (CPU) instance type, an amount of memory to allocate, a type of virtual machine instance to use for training, and so forth).

In some embodiments, the container image can include one or more layers, where each layer represents an executable instruction. Some or all of the executable instructions together represent an algorithm that defines a machine learning model. The executable instructions (for example, the algorithm) can be written in any programming language (for example, Python, Ruby, C++, Java, etc.). In some embodiments, the algorithm is pre-generated and obtained by a user, via the user device 602, from an algorithm repository (for example, a network-accessible marketplace, a data store provided by a machine learning training service, etc.). In some embodiments, the algorithm is completely user-generated or partially user-generated (for example, user-provided code modifies or configures existing algorithmic code).

In some embodiments, instead of providing a container image (or identifier thereof) in the training request, the user device 602 may provide, in the training request, an algorithm written in any programming language. The model training system 120 then packages the algorithm into a container (optionally with other code, such as a "base" ML algorithm supplemented with user-provided code) that is eventually loaded into a virtual machine instance 622 for training a machine learning model, as described in greater detail below. For example, a user, via a user device 602, may develop an algorithm/code using an application (for example, an interactive web-based programming environment) and cause the algorithm/code to be provided—perhaps as part of a training request (or referenced in a training request)—to the model training system 120, where this algorithm/code may be containerized on its own or used together with an existing container having a machine learning framework, for example.

In some embodiments, instead of providing a container image in the training request, the user device 602 provides, in the training request, an indicator of a container image (for example, an indication of an address or a location at which a container image is stored). For example, the container image can be stored in a container data store 670, and this container image may have been previously created/uploaded by the user. The model training system 120 can retrieve the container image from the indicated location and create a container using the retrieved container image. The container is then loaded into a virtual machine instance 622 for training a machine learning model, as described in greater detail below.

The model training system 120 can use the information provided by the user device 602 to train a machine learning model in one or more pre-established virtual machine instances 622 in some embodiments. In particular, the model training system 120 includes a single physical computing device or multiple physical computing devices that are interconnected using one or more computing networks (not shown), where the physical computing device(s) host one or more virtual machine instances 622. The model training system 120 can handle the acquisition and configuration of compute capacity (for example, containers, instances, etc., which are described in greater detail below) based on the information describing the computing machine on which to train a machine learning model provided by the user device 602. The model training system 120 can then train machine learning models using the compute capacity, as is described in greater detail below. The model training system 120 can automatically scale up and down based on the volume of training requests received from user devices 602 via frontend 629, thereby relieving the user from the burden of having to worry about over-utilization (for example, acquiring too little computing resources and suffering performance issues) or under-utilization (for example, acquiring more computing resources than necessary to train the machine learning models, and thus overpaying).

In some embodiments, the virtual machine instances 622 are utilized to execute tasks. For example, such tasks can include training a machine learning model. As shown in FIG. 6, each virtual machine instance 622 includes an operating system (OS) 624, a language runtime 626, and one or more ML training containers 630. Generally, the ML training containers 630 are logical units created within a virtual machine instance using the resources available on that instance and can be utilized to isolate execution of a task from other processes (for example, task executions) occurring in the instance. In some embodiments, the ML training containers 630 are formed from one or more container images and a top container layer. Each container image may further include one or more image layers, where each image layer represents an executable instruction. As described above, some or all of the executable instructions together represent an algorithm that defines a machine learning model. Changes made to the ML training containers 630 (for example, creation of new files, modification of existing files, deletion of files, etc.) are stored in the top container layer. If a ML training container 630 is deleted, the top container layer is also deleted. However, the container image(s) that form a portion of the deleted ML training container 630 can remain unchanged. The ML training containers 630 can be implemented, for example, as Linux containers (LXC), Docker containers, and the like.

The ML training containers 630 may include individual a runtime 634, code 637, and dependencies 632 needed by the code 637 in some embodiments. The runtime 634 can be defined by one or more executable instructions that form at least a portion of a container image that is used to form the ML training container 630 (for example, the executable instruction(s) in the container image that define the operating system and/or runtime to run in the container formed from the container image). The code 637 includes one or more executable instructions that form at least a portion of a container image that is used to form the ML training container 630. For example, the code 637 includes the executable instructions in the container image that represent an algorithm that defines a machine learning model, which may reference (or utilize) code or libraries from dependencies 632. The runtime 634 is configured to execute the code 637 in response to an instruction to begin machine learning model training. Execution of the code 637 results in the generation of model data, as described in greater detail below.

In some embodiments, the code 637 includes executable instructions that represent algorithms that define different machine learning models. For example, the code 637 includes one set of executable instructions that represent a first algorithm that defines a first machine learning model and a second set of executable instructions that represent a second algorithm that defines a second machine learning model. In some embodiments, the virtual machine instance 622 executes the code 637 and trains all of the machine learning models. In some embodiments, the virtual machine instance 622 executes the code 637, selecting one of the machine learning models to train. For example, the virtual machine instance 622 can identify a type of training data indicated by the training request and select a machine learning model to train (for example, execute the executable instructions that represent an algorithm that defines the selected machine learning model) that corresponds with the identified type of training data.

In some embodiments, the runtime 634 is the same as the runtime 626 utilized by the virtual machine instance 622. In some embodiments, the runtime 634 is different than the runtime 626 utilized by the virtual machine instance 622.

In some embodiments, the model training system 120 uses one or more container images included in a training request (or a container image retrieved from the container data store 670 in response to a received training request) to create and initialize a ML training container 630 in a virtual machine instance 622. For example, the model training system 120 creates a ML training container 630 that includes the container image(s) and/or a top container layer.

Prior to beginning the training process, in some embodiments, the model training system 120 retrieves training data from the location indicated in the training request. For example, the location indicated in the training request can be a location in the training data store 660. Thus, the model training system 120 retrieves the training data from the indicated location in the training data store 660. In some embodiments, the model training system 120 does not retrieve the training data prior to beginning the training process. Rather, the model training system 120 streams the training data from the indicated location during the training process. For example, the model training system 120 can initially retrieve a portion of the training data and provide the retrieved portion to the virtual machine instance 622 training the machine learning model. Once the virtual machine instance 622 has applied and used the retrieved portion or once the virtual machine instance 622 is about to use all of the retrieved portion (for example, a buffer storing the retrieved portion is nearly empty), then the model training system 120 can retrieve a second portion of the training data and provide the second retrieved portion to the virtual machine instance 622, and so on.

To perform the machine learning model training, the virtual machine instance 622 executes code 637 stored in the ML training container 630 in some embodiments. For example, the code 637 includes some or all of the executable instructions that form the container image of the ML training container 630 initialized therein. Thus, the virtual machine instance 622 executes some or all of the executable instructions that form the container image of the ML training container 630 initialized therein to train a machine learning model. The virtual machine instance 622 executes some or all of the executable instructions according to the hyperparameter values included in the training request. As an illustrative example, the virtual machine instance 622 trains a machine learning model by identifying values for certain parameters (for example, coefficients, weights, centroids, etc.). The identified values depend on hyperparameters that define how the training is performed. Thus, the virtual machine instance 622 can execute the executable instructions to initiate a machine learning model training process, where the training process is run using the hyperparameter values included in the training request. Execution of the executable instructions can include the virtual machine instance 622 applying the training data retrieved by the model training system 120 as input parameters to some or all of the instructions being executed.

In some embodiments, executing the executable instructions causes the virtual machine instance 622 (for example, the ML training container 630) to generate model data. For example, the ML training container 630 generates model data and stores the model data in a file system of the ML training container 630. The model data includes characteristics of the machine learning model being trained, such as a number of layers in the machine learning model, hyperparameters of the machine learning model, coefficients of the machine learning model, weights of the machine learning model, and/or the like. In particular, the generated model data includes values for the characteristics that define a machine learning model being trained. In some embodiments, executing the executable instructions causes a modification to the ML training container 630 such that the model data is written to the top container layer of the ML training container 630 and/or the container image(s) that forms a portion of the ML training container 630 is modified to include the model data.

The virtual machine instance 622 (or the model training system 120 itself) pulls the generated model data from the ML training container 630 and stores the generated model data in the training model data store 675 in an entry associated with the virtual machine instance 622 and/or the machine learning model being trained. In some embodiments, the virtual machine instance 622 generates a single file that includes model data and stores the single file in the training model data store 675. In some embodiments, the virtual machine instance 622 generates multiple files during the course of training a machine learning model, where each file includes model data. In some embodiments, each model data file includes the same or different model data information (for example, one file identifies the structure of an algorithm, another file includes a list of coefficients, etc.). The virtual machine instance 622 can package the multiple files into a single file once training is complete and store the single file in the training model data store 675. Alternatively, the virtual machine instance 622 stores the multiple files in the training model data store 675. The virtual machine instance 622 stores the file(s) in the training model data store 675 while the training process is ongoing and/or after the training process is complete.

In some embodiments, the virtual machine instance 622 regularly stores model data file(s) in the training model data store 675 as the training process is ongoing. Thus, model data file(s) can be stored in the training model data store 675 at different times during the training process. Each set of model data files corresponding to a particular time or each set of model data files present in the training model data store 675 as of a particular time could be checkpoints that represent different versions of a partially-trained machine learning model during different stages of the training process. Accordingly, before training is complete, a user, via the user device 602 can submit a deployment and/or execution request in a manner as described below to deploy and/or execute a version of a partially trained machine learning model (for example, a machine learning model trained as of a certain stage in the training process). A version of a partially-trained machine learning model can be based on some or all of the model data files stored in the training model data store 675.

In some embodiments, a virtual machine instance 622 executes code 637 stored in a plurality of ML training containers 630. For example, the algorithm included in the container image can be in a format that allows for the parallelization of the training process. Thus, the model training system 120 can create multiple copies of the container image provided in a training request and cause the virtual machine instance 622 to load each container image copy in a separate ML training container 630. The virtual machine instance 622 can then execute, in parallel, the code 637 stored in the ML training containers 630. The virtual machine instance 622 can further provide configuration information to each ML training container 630 (for example, information indicating that N ML training containers 630 are collectively training a machine learning model and that a particular ML training container 630 receiving the configuration information is ML training container 630 number X of N), which can be included in the resulting model data. By parallelizing the training process, the model training system 120 can significantly reduce the training time in some embodiments.

In some embodiments, a plurality of virtual machine instances 622 execute code 637 stored in a plurality of ML training containers 630. For example, the resources used to train a particular machine learning model can exceed the limitations of a single virtual machine instance 622. However, the algorithm included in the container image can be in a format that allows for the parallelization of the training process. Thus, the model training system 120 can create multiple copies of the container image provided in a training request, initialize multiple virtual machine instances 622, and cause each virtual machine instance 622 to load a container image copy in one or more separate ML training containers 630. The virtual machine instances 622 can then each execute the code 637 stored in the ML training containers 630 in parallel. The model training system 120 can further provide configuration information to each ML training container 630 via the virtual machine instances 622 (for example, information indicating that N ML training containers 630 are collectively training a machine learning model and that a particular ML training container 630 receiving the configuration information is ML training container 630 number X of N, information indicating that M virtual machine instances 622 are collectively training a machine learning model and that a particular ML training container 630 receiving the configuration information is initialized in virtual machine instance 622 number Y of M, etc.), which can be included in the resulting model data. As described above, by parallelizing the training process, the model training system 120 can significantly reduce the training time in some embodiments.

In some embodiments, the model training system 120 includes a plurality of physical computing devices and two or more of the physical computing devices hosts one or more virtual machine instances 622 that execute the code 637. Thus, the parallelization can occur over different physical computing devices in addition to over different virtual machine instances 622 and/or ML training containers 630.

In some embodiments, the model training system 120 includes a ML model evaluator 628. The ML model evaluator 628 can monitor virtual machine instances 622 as machine learning models are being trained, obtaining the generated model data and processing the obtained model data to generate model metrics. For example, the model metrics can include quality metrics, such as an error rate of the machine learning model being trained, a statistical distribution of the machine learning model being trained, a latency of the machine learning model being trained, a confidence level of the machine learning model being trained (for example, a level of confidence that the accuracy of the machine learning model being trained is known, etc. The ML model evaluator 628 can obtain the model data for a machine learning model being trained and evaluation data from the training data store 660. The evaluation data is separate from the data used to train a machine learning model and includes both input data and expected outputs (for example, known results), and thus the ML model evaluator 628 can define a machine learning model using the model data and execute the machine learning model by providing the input data as inputs to the machine learning model. The ML model evaluator 628 can then compare the outputs of the machine learning model to the expected outputs and determine one or more quality metrics of the machine learning model being trained based on the comparison (for example, the error rate can be a difference or distance between the machine learning model outputs and the expected outputs).

The ML model evaluator 628 periodically generates model metrics during the training process and stores the model metrics in the training metrics data store 665 in some embodiments. While the machine learning model is being trained, a user, via the user device 602, can access and retrieve the model metrics from the training metrics data store 665. The user can then use the model metrics to determine whether to adjust the training process and/or to stop the training process. For example, the model metrics can indicate that the machine learning model is performing poorly (for example, has an error rate above a threshold value, has a statistical distribution that is not an expected or desired distribution (for example, not a binomial distribution, a Poisson distribution, a geometric distribution, a normal distribution, Gaussian distribution, etc.), has an execution latency above a threshold value, has a confidence level below a threshold value)) and/or is performing progressively worse (for example, the quality metric continues to worsen over time). In response, in some embodiments, the user, via the user device 602, can transmit a request to the model training system 120 to modify the machine learning model being trained (for example, transmit a modification request). The request can include a new or modified container image, a new or modified algorithm, new or modified hyperparameter(s), and/or new or modified information describing the computing machine on which to train a machine learning model. The model training system 120 can modify the machine learning model accordingly. For example, the model training system 120 can cause the virtual machine instance 622 to optionally delete an existing ML training container 630, create and initialize a new ML training container 630 using some or all of the information included in the request, and execute the code 637 stored in the new ML training container 630 to restart the machine learning model training process. As another example, the model training system 120 can cause the virtual machine instance 622 to modify the execution of code stored in an existing ML training container 630 according to the data provided in the modification request. In some embodiments, the user, via the user device 602, can transmit a request to the model training system 120 to stop the machine learning model training process. The model training system 120 can then instruct the virtual machine instance 622 to delete the ML training container 630 and/or to delete any model data stored in the training model data store 675.

As described below, in some embodiments, the model data stored in the training model data store 675 is used by the model hosting system 140 to deploy machine learning models. Alternatively or additionally, a user device 602 or another computing device (not shown) can retrieve the model data from the training model data store 675 to implement a learning algorithm in an external device. As an illustrative example, a robotic device can include sensors to capture input data. A user device 602 can retrieve the model data from the training model data store 675 and store the model data in the robotic device. The model data defines a machine learning model. Thus, the robotic device can provide the captured input data as an input to the machine learning model, resulting in an output. The robotic device can then perform an action (for example, move forward, raise an arm, generate a sound, etc.) based on the resulting output.

While the virtual machine instances 622 are shown in FIG. 6 as a single grouping of virtual machine instances 622, some embodiments of the present application separate virtual machine instances 622 that are actively assigned to execute tasks from those virtual machine instances 622 that are not actively assigned to execute tasks. For example, those virtual machine instances 622 actively assigned to execute tasks are grouped into an "active pool," while those virtual machine instances 622 not actively assigned to execute tasks are placed within a "warming pool." In some embodiments, those virtual machine instances 622 within the warming pool can be pre-initialized with an operating system, language runtimes, and/or other software required to enable rapid execution of tasks (for example, rapid initialization of machine learning model training in ML training container(s) 630) in response to training requests.

In some embodiments, the model training system 120 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 602, the model hosting system 140, etc.). The processing unit can also communicate to and from a memory of a virtual machine instance 622 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the model hosting system 140 includes a single physical computing device or multiple physical computing devices that are interconnected using one or more computing networks (not shown), where the physical computing device(s) host one or more virtual machine instances 642. The model hosting system 140 can handle the acquisition and configuration of compute capacity (for example, containers, instances, etc.) based on demand for the execution of trained machine learning models. The model hosting system 140 can then execute machine learning models using the compute capacity, as is described in greater detail below. The model hosting system 140 can automatically scale up and down based on the volume of execution requests received from user devices 602 via frontend 649 of the model hosting system 140, thereby relieving the user from the burden of having to worry about over-utilization (for example, acquiring too little computing resources and suffering performance issues) or under-utilization (for example, acquiring more computing resources than necessary to run the machine learning models, and thus overpaying).

In some embodiments, the virtual machine instances 642 are utilized to execute tasks. For example, such tasks can include executing a machine learning model. As shown in FIG. 6, each virtual machine instance 642 includes an operating system (OS) 644, a language runtime 646, and one or more ML scoring containers 650. The ML scoring containers 650 are similar to the ML training containers 630 in that the ML scoring containers 650 are logical units created within a virtual machine instance using the resources available on that instance and can be utilized to isolate execution of a task from other processes (for example, task executions) occurring in the instance. In some embodiments, the ML scoring containers 650 are formed from one or more container images and a top container layer. Each container image further includes one or more image layers, where each image layer represents an executable instruction. As described above, some or all of the executable instructions together represent an algorithm that defines a machine learning model. Changes made to the ML scoring containers 650 (for example, creation of new files, modification of existing files, deletion of files, etc.) are stored in the top container layer. If a ML scoring container 650 is deleted, the top container layer is also deleted. However, the container image(s) that form a portion of the deleted ML scoring container 650 can remain unchanged. The ML scoring containers 650 can be implemented, for example, as Linux containers.

The ML scoring containers 650 each include a runtime 654, code 656, and dependencies 652 (for example, supporting software such as libraries) needed by the code 656 in some embodiments. The runtime 654 can be defined by one or more executable instructions that form at least a portion of a container image that is used to form the ML scoring container 650 (for example, the executable instruction(s) in the container image that define the operating system and/or runtime to run in the container formed from the container image). The code 656 includes one or more executable instructions that form at least a portion of a container image that is used to form the ML scoring container 650. For example, the code 656 includes the executable instructions in the container image that represent an algorithm that defines a machine learning model, which may reference dependencies 652. The code 656 can also include model data that represent characteristics of the defined machine learning model, as described in greater detail below. The runtime 654 is configured to execute the code 656 in response to an instruction to begin execution of a machine learning model. Execution of the code 656 results in the generation of outputs (for example, predicted results), as described in greater detail below.

In some embodiments, the runtime 654 is the same as the runtime 646 utilized by the virtual machine instance 642. In some embodiments, runtime 654 is different than the runtime 646 utilized by the virtual machine instance 642.

In some embodiments, the model hosting system 140 uses one or more container images included in a deployment request (or a container image retrieved from the container data store 670 in response to a received deployment request) to create and initialize a ML scoring container 650 in a virtual machine instance 642. For example, the model hosting system 140 creates a ML scoring container 650 that includes the container image(s) and/or a top container layer.

As described above, a user device 602 can submit a deployment request and/or an execution request to the model hosting system 140 via the frontend 649 in some embodiments. A deployment request causes the model hosting system 140 to deploy a trained machine learning model into a virtual machine instance 642. For example, the deployment request can include an identification of an endpoint (for example, an endpoint name, such as an HTTP endpoint name) and an identification of one or more trained machine learning models (for example, a location of one or more model data files stored in the training model data store 675). Optionally, the deployment request also includes an identification of one or more container images stored in the container data store 670.

Upon receiving the deployment request, the model hosting system 140 initializes ones or more ML scoring containers 650 in one or more hosted virtual machine instance 642. In embodiments in which the deployment request includes an identification of one or more container images, the model hosting system 140 forms the ML scoring container(s) 650 from the identified container image(s). For example, a container image identified in a deployment request can be the same container image used to form an ML training container 630 used to train the machine learning model corresponding to the deployment request. Thus, the code 656 of the ML scoring container(s) 650 includes one or more executable instructions in the container image(s) that represent an algorithm that defines a machine learning model. In embodiments in which the deployment request does not include an identification of a container image, the model hosting system 140 forms the ML scoring container(s) 650 from one or more container images stored in the container data store 670 that are appropriate for executing the identified trained machine learning model(s). For example, an appropriate container image can be a container image that includes executable instructions that represent an algorithm that defines the identified trained machine learning model(s).

The model hosting system 140 further forms the ML scoring container(s) 650 by retrieving model data corresponding to the identified trained machine learning model(s) in some embodiments. For example, the deployment request can identify a location of model data file(s) stored in the training model data store 675. In embodiments in which a single model data file is identified in the deployment request, the model hosting system 140 retrieves the identified model data file from the training model data store 675 and inserts the model data file into a single ML scoring container 650, which forms a portion of code 656. In some embodiments, the model data file is archived or compressed (for example, formed from a package of individual files). Thus, the model hosting system 140 unarchives or decompresses the model data file to obtain multiple individual files and inserts the individual files into the ML scoring container 650. In some embodiments, the model hosting system 140 stores the model data file in the same location as the location in which the model data file was stored in the ML training container 630 that generated the model data file. For example, the model data file initially was stored in the top container layer of the ML training container 630 at a certain offset, and the model hosting system 140 then stores the model data file in the top container layer of the ML scoring container 650 at the same offset.

In embodiments in which multiple model data files are identified in the deployment request, the model hosting system 140 retrieves the identified model data files from the training model data store 675. The model hosting system 140 can insert the model data files into the same ML scoring container 650, into different ML scoring containers 650 initialized in the same virtual machine instance 642, or into different ML scoring containers 650 initialized in different virtual machine instances 642. As an illustrative example, the deployment request can identify multiple model data files corresponding to different trained machine learning models because the trained machine learning models are related (for example, the output of one trained machine learning model is used as an input to another trained machine learning model). Thus, the user may desire to deploy multiple machine learning models to eventually receive a single output that relies on the outputs of multiple machine learning models.

In some embodiments, the model hosting system 140 associates the initialized ML scoring container(s) 650 with the endpoint identified in the deployment request. For example, each of the initialized ML scoring container(s) 650 can be associated with a network address. The model hosting system 140 can map the network address(es) to the identified endpoint, and the model hosting system 140 or another system (for example, a routing system, not shown) can store the mapping. Thus, a user device 602 can refer to trained machine learning model(s) stored in the ML scoring container(s) 650 using the endpoint. This allows for the network address of an ML scoring container 650 to change without causing the user operating the user device 602 to change the way in which the user refers to a trained machine learning model.

Once the ML scoring container(s) 650 are initialized, the ML scoring container(s) 650 are ready to execute trained machine learning model(s). In some embodiments, the user device 602 transmits an execution request to the model hosting system 140 via the frontend 649, where the execution request identifies an endpoint and includes an input to a machine learning model (for example, a set of input data). The model hosting system 140 or another system (for example, a routing system, not shown) can obtain the execution request, identify the ML scoring container(s) 650 corresponding to the identified endpoint, and route the input to the identified ML scoring container(s) 650.

In some embodiments, a virtual machine instance 642 executes the code 656 stored in an identified ML scoring container 650 in response to the model hosting system 140 receiving the execution request. In particular, execution of the code 656 causes the executable instructions in the code 656 corresponding to the algorithm to read the model data file stored in the ML scoring container 650, use the input included in the execution request as an input parameter, and generate a corresponding output. As an illustrative example, the algorithm can include coefficients, weights, layers, cluster centroids, and/or the like. The executable instructions in the code 656 corresponding to the algorithm can read the model data file to determine values for the coefficients, weights, layers, cluster centroids, and/or the like. The executable instructions can include input parameters, and the input included in the execution request can be supplied by the virtual machine instance 642 as the input parameters. With the machine learning model characteristics and the input parameters provided, execution of the executable instructions by the virtual machine instance 642 can be completed, resulting in an output.

In some embodiments, the virtual machine instance 642 stores the output in the model prediction data store 680. Alternatively or in addition, the virtual machine instance 642 transmits the output to the user device 602 that submitted the execution result via the frontend 649.

In some embodiments, the execution request corresponds to a group of related trained machine learning models. Thus, the ML scoring container 650 can transmit the output to a second ML scoring container 650 initialized in the same virtual machine instance 642 or in a different virtual machine instance 642. The virtual machine instance 642 that initialized the second ML scoring container 650 can then execute second code 656 stored in the second ML scoring container 650, providing the received output as an input parameter to the executable instructions in the second code 656. The second ML scoring container 650 further includes a model data file stored therein, which is read by the executable instructions in the second code 656 to determine values for the characteristics defining the machine learning model. Execution of the second code 656 results in a second output. The virtual machine instance 642 that initialized the second ML scoring container 650 can then transmit the second output to the model prediction data store 680 and/or the user device 602 via the frontend 649 (for example, if no more trained machine learning models are needed to generate an output) or transmit the second output to a third ML scoring container 650 initialized in the same or different virtual machine instance 642 (for example, if outputs from one or more additional trained machine learning models are needed), and the above-referenced process can be repeated with respect to the third ML scoring container 650.

While the virtual machine instances 642 are shown in FIG. 6 as a single grouping of virtual machine instances 642, some embodiments of the present application separate virtual machine instances 642 that are actively assigned to execute tasks from those virtual machine instances 642 that are not actively assigned to execute tasks. For example, those virtual machine instances 642 actively assigned to execute tasks are grouped into an "active pool," while those virtual machine instances 642 not actively assigned to execute tasks are placed within a "warming pool." In some embodiments, those virtual machine instances 642 within the warming pool can be pre-initialized with an operating system, language runtimes, and/or other software required to enable rapid execution of tasks (for example, rapid initialization of ML scoring container(s) 650, rapid execution of code 656 in ML scoring container(s), etc.) in response to deployment and/or execution requests.

In some embodiments, the model hosting system 140 includes a processing unit, a network interface, a computer-readable medium drive, and an input/output device interface, all of which can communicate with one another by way of a communication bus. The network interface can provide connectivity to one or more networks or computing systems. The processing unit can thus receive information and instructions from other computing systems or services (for example, user devices 602, the model training system 120, etc.). The processing unit can also communicate to and from a memory of a virtual machine instance 642 and further provide output information for an optional display via the input/output device interface. The input/output device interface can also accept input from an optional input device. The memory can contain computer program instructions (grouped as modules in some embodiments) that the processing unit executes in order to implement one or more aspects of the present disclosure.

In some embodiments, the operating environment supports many different types of machine learning models, such as multi arm bandit models, reinforcement learning models, ensemble machine learning models, deep learning models, and/or the like.

The model training system 120 and the model hosting system 140 depicted in FIG. 6 are not meant to be limiting. For example, the model training system 120 and/or the model hosting system 140 could also operate within a computing environment having a fewer or greater number of devices than are illustrated in FIG. 6. Thus, the depiction of the model training system 120 and/or the model hosting system 140 in FIG. 6 may be taken as illustrative and not limiting to the present disclosure. For example, the model training system 120 and/or the model hosting system 140 or various constituents thereof could implement various web services components, hosted or "cloud" computing environments, and/or peer-to-peer network configurations to implement at least a portion of the processes described herein. In some embodiments, the model training system 120 and/or the model hosting system 140 are implemented directly in hardware or software executed by hardware devices and may, for instance, include one or more physical or virtual servers implemented on physical computer hardware configured to execute computer-executable instructions for performing the various features that are described herein. The one or more servers can be geographically dispersed or geographically co-located, for instance, in one or more points of presence (POPs) or regional data centers.

The frontend 629 processes all training requests received from user devices 602 and provisions virtual machine instances 622. In some embodiments, the frontend 629 serves as a front door to all the other services provided by the model training system 120. The frontend 629 processes the requests and makes sure that the requests are properly authorized. For example, the frontend 629 may determine whether the user associated with the training request is authorized to initiate the training process.

Similarly, frontend 649 processes all deployment and execution requests received from user devices 602 and provisions virtual machine instances 642. In some embodiments, the frontend 649 serves as a front door to all the other services provided by the model hosting system 140. The frontend 649 processes the requests and makes sure that the requests are properly authorized. For example, the frontend

649 may determine whether the user associated with a deployment request or an execution request is authorized to access the indicated model data and/or to execute the indicated machine learning model.

The training data store 660 stores training data and/or evaluation data. The training data can be data used to train machine learning models and evaluation data can be data used to evaluate the performance of machine learning models. In some embodiments, the training data and the evaluation data have common data. In some embodiments, the training data and the evaluation data do not have common data. In some embodiments, the training data includes input data and expected outputs. While the training data store 660 is depicted as being located external to the model training system 120 and the model hosting system 140, this is not meant to be limiting. For example, in some embodiments not shown, the training data store 660 is located internal to at least one of the model training system 120 or the model hosting system 140.

In some embodiments, the training metrics data store 665 stores model metrics. While the training metrics data store 665 is depicted as being located external to the model training system 120 and the model hosting system 140, this is not meant to be limiting. For example, in some embodiments not shown, the training metrics data store 665 is located internal to at least one of the model training system 120 or the model hosting system 140.

The container data store 670 stores container images, such as container images used to form ML training containers 630 and/or ML scoring containers 650, that can be retrieved by various virtual machine instances 622 and/or 642. While the container data store 670 is depicted as being located external to the model training system 120 and the model hosting system 140, this is not meant to be limiting. For example, in some embodiments not shown, the container data store 670 is located internal to at least one of the model training system 120 and the model hosting system 140.

The training model data store 675 stores model data files. In some embodiments, some of the model data files are comprised of a single file, while other model data files are packages of multiple individual files. While the training model data store 675 is depicted as being located external to the model training system 120 and the model hosting system 140, this is not meant to be limiting. For example, in some embodiments not shown, the training model data store 675 is located internal to at least one of the model training system 120 or the model hosting system 140.

The model prediction data store 680 stores outputs (for example, execution results) generated by the ML scoring containers 650 in some embodiments. While the model prediction data store 680 is depicted as being located external to the model training system 120 and the model hosting system 140, this is not meant to be limiting. For example, in some embodiments not shown, the model prediction data store 680 is located internal to at least one of the model training system 120 and the model hosting system 140.

While the model training system 120, the model hosting system 140, the training data store 660, the training metrics data store 665, the container data store 670, the training model data store 675, and the model prediction data store 680 are illustrated as separate components, this is not meant to be limiting. In some embodiments, any one or all of these components can be combined to perform the functionality described herein. For example, any one or all of these components can be implemented by a single computing device, or by multiple distinct computing devices, such as computer servers, logically or physically grouped together to collectively operate as a server system. Any one or all of these components can communicate via a shared internal network, and the collective system (for example, also referred to herein as a machine learning service) can communicate with one or more of the user devices 602 via the one or more network(s) 106.

Various example user devices 602 are shown in FIG. 6, including a desktop computer, laptop, and a mobile phone, each provided by way of illustration. In general, the user devices 602 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. In some embodiments, the model training system 120 and/or the model hosting system 140 provides the user devices 602 with one or more user interfaces, command-line interfaces (CLI), application programming interfaces (API), and/or other programmatic interfaces for submitting training requests, deployment requests, and/or execution requests. In some embodiments, the user devices 602 can execute a stand-alone application that interacts with the model training system 120 and/or the model hosting system 140 for submitting training requests, deployment requests, and/or execution requests.

In some embodiments, the network 106 includes any wired network, wireless network, or combination thereof. For example, the network 106 may be a personal area network, local area network, wide area network, over-the-air broadcast network (for example, for radio or television), cable network, satellite network, cellular telephone network, or combination thereof. As a further example, the network 106 may be a publicly accessible network of linked networks, possibly operated by various distinct parties, such as the Internet. In some embodiments, the network 106 may be a private or semi-private network, such as a corporate or university intranet. The network 106 may include one or more wireless networks, such as a Global System for Mobile Communications (GSM) network, a Code Division Multiple Access (CDMA) network, a Long Term Evolution (LTE) network, or any other type of wireless network. The network 106 can use protocols and components for communicating via the Internet or any of the other aforementioned types of networks. For example, the protocols used by the network 106 may include HTTP, HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

Figure 7:
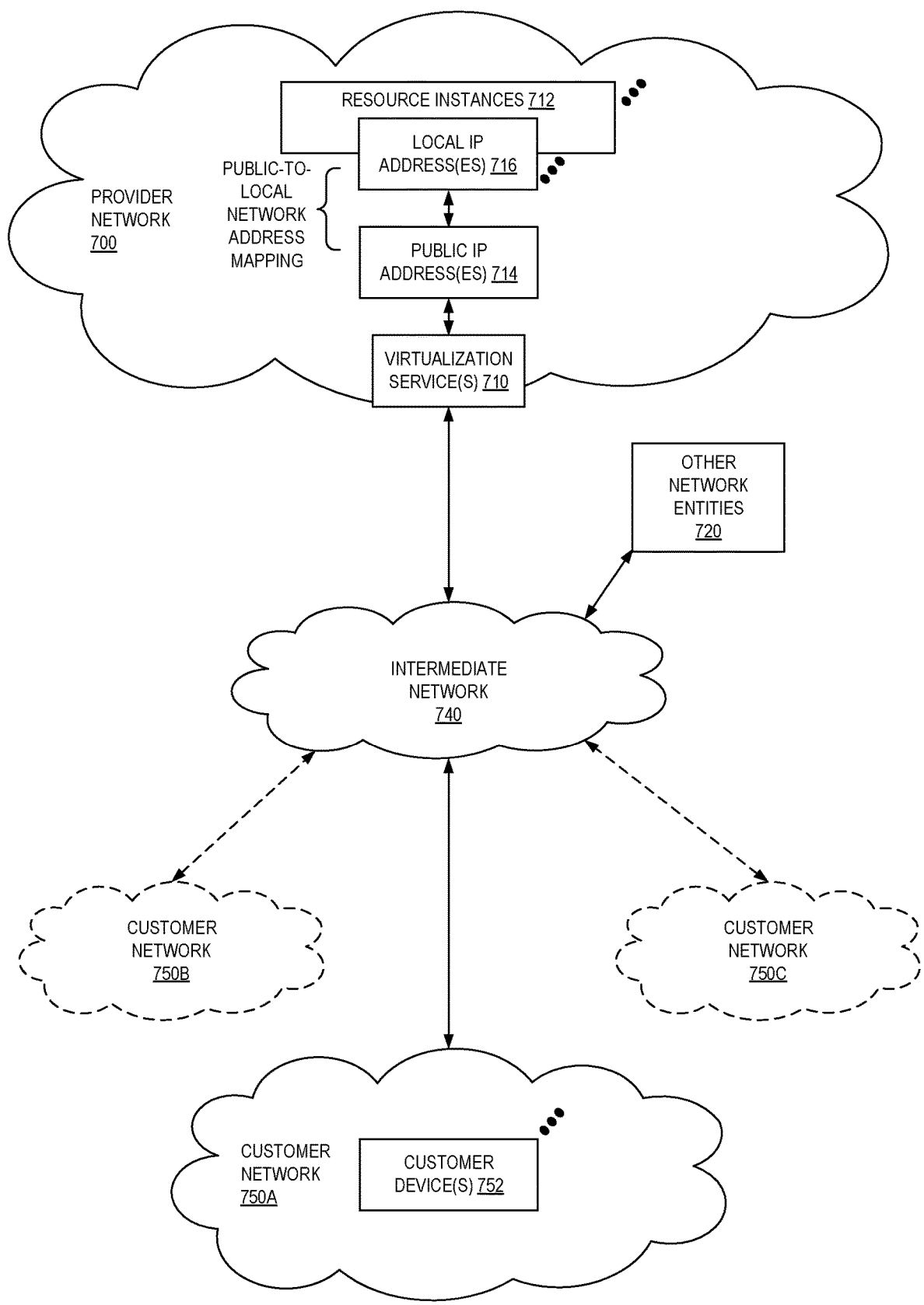
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193, and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 8:
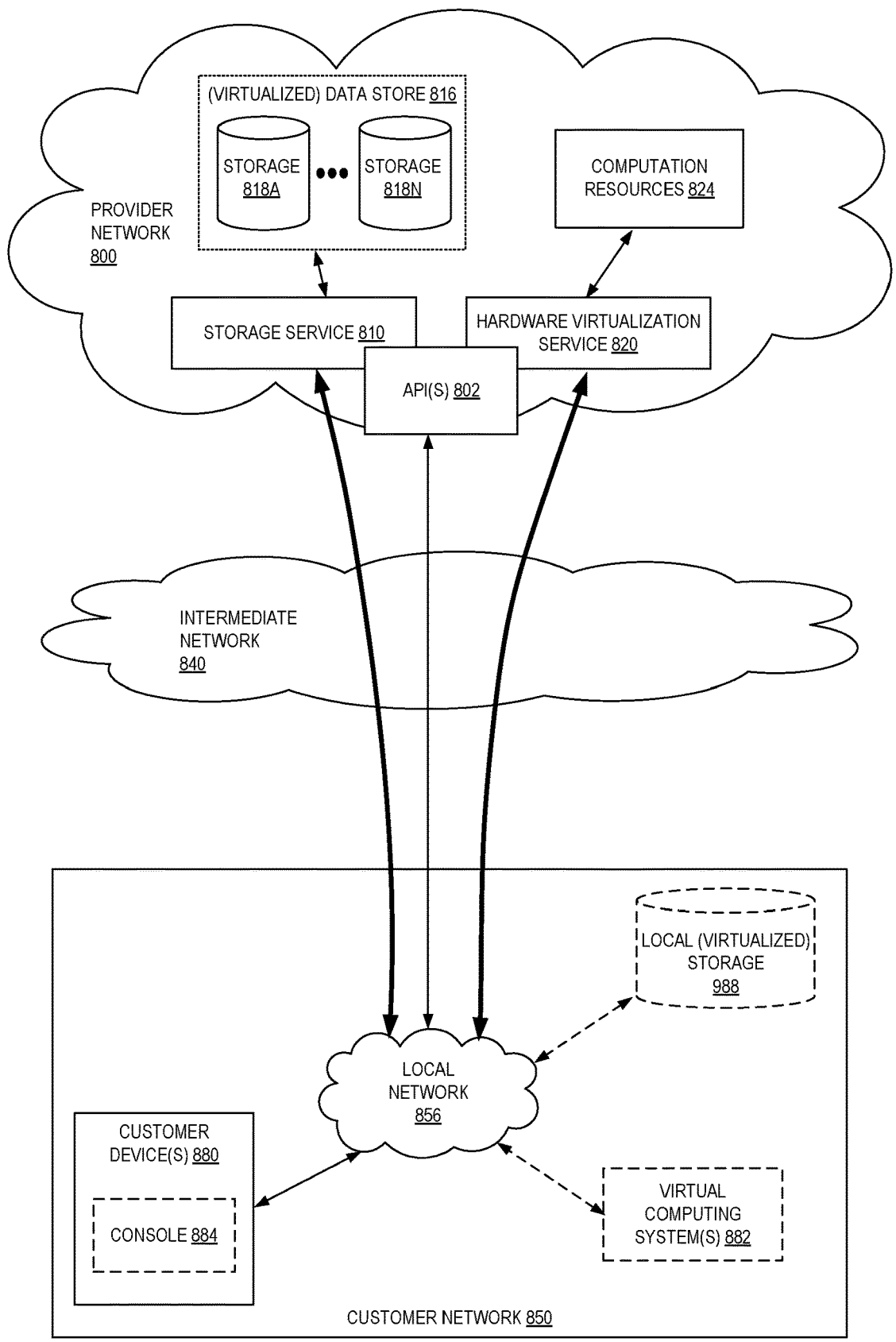
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple computation resources 824 (e.g., VMs) to customers. The computation resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the computation resources 824 to public Internet destinations, and from public Internet sources to the local IP addresses of computation resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.

Illustrative System

Figure 9:
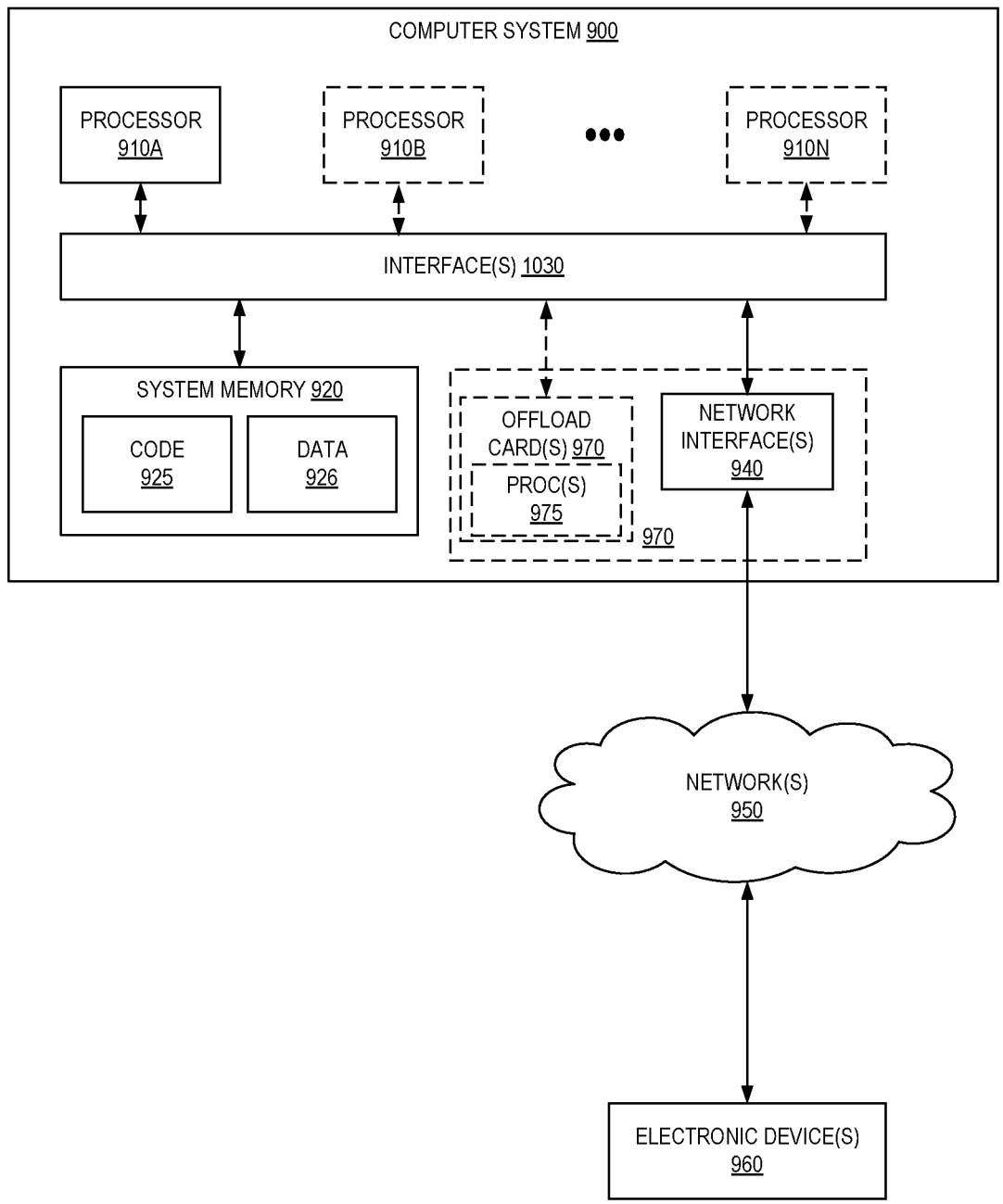
FIG. 9 is a block diagram illustrating an example computer system that may be used in some embodiments.

In some embodiments, a system that implements a portion or all of the techniques for described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as code 925 and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970 (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute instances, and the one or more offload cards 970 execute a virtualization manager that can manage compute instances that execute on the host electronic device. As an example, in some embodiments the offload card(s) 970 can perform compute instance management operations such as pausing and/or un-pausing compute instances, launching and/or terminating compute instances, performing memory transfer/copying operations, etc. These management operations may, in some embodiments, be performed by the offload card(s) 970 in coordination with a hypervisor (e.g., upon a request from a hypervisor) that is executed by the other processors 910A-910N of the computer system 900. However, in some embodiments the virtualization manager implemented by the offload card(s) 970 can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 918A-918N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving, at an interface of a multi-tenant provider network, a request to deploy a deep neural network (DNN) type machine learning (ML) model to one or more edge computing devices having a hardware platform from among a plurality of hardware platforms, the request including an identifier of the ML model or a storage location of the ML model within the provider network;
   obtaining the ML model from the storage location;
   generating an intermediate representation for the ML model, the intermediate representation including one or more nodes corresponding to one or more operators utilized by the ML model;
   generating a plurality of scores for a plurality of schedules for at least one node of the intermediate representation using a hardware-specific linear cost model, the hardware-specific linear cost model including terms corresponding to different hardware features of the hardware platform;
   identifying, for the at least one node of the intermediate representation, an optimized schedule for at least one operator corresponding to the at least one node based on the plurality of scores generated using the hardware-specific linear cost model;
   generating an optimized intermediate representation using the optimized schedule;
   generating code corresponding to the ML model based at least in part on the optimized intermediate representation, wherein the code is specific to the hardware platform; and
   transmitting the code for deployment to the one or more edge computing devices.

2. The computer-implemented method of claim 1, wherein the hardware-specific linear cost model is a CPU cost model and wherein the terms include at least one of a number of single instruction multiple data (SIMD) instructions, an estimate of L1 cache miss, or instruction level parallelism.

3. The computer-implemented method of claim 1, wherein the hardware-specific linear cost model is a GPU cost model and wherein the terms include at least one of a number of parallel thread execution (PTX) instructions or instruction level parallelism.

4. A computer-implemented method comprising:
   obtaining a deep neural network (DNN) machine learning (ML) model;
   generating an intermediate representation for the ML model, the intermediate representation including one or more nodes corresponding to one or more operators utilized by the ML model;
   identifying, for at least one node of the intermediate representation, an optimized schedule for at least one operator corresponding to the at least one node using a static analysis that is based on a hardware-specific cost model;
   generating an optimized intermediate representation using the optimized schedule that is optimized for execution on a hardware platform from among a plurality of hardware platforms; and
   generating code corresponding to the ML model based at least in part on the optimized intermediate representation, wherein the code is specific to the hardware platform.

5. The computer-implemented method of claim 4, wherein identifying, for the at least one node of the intermediate representation, an optimized schedule for at least one operator corresponding to the at least one node using a static analysis that is based on a hardware-specific cost model, further comprises:
   generating a plurality of scores for a plurality of schedules for the at least one node of the intermediate representation using the hardware-specific cost model, the hardware-specific cost model including terms corresponding to different features of the hardware platform; and
   identifying the optimized schedule based on the plurality of scores using a parallel black box search algorithm.

6. The computer-implemented method of claim 5, wherein identifying, for the at least one node of the intermediate representation, an optimized schedule for at least one operator corresponding to the at least one node using a static analysis that is based on a hardware-specific cost model, further comprises:
   extracting one or more hardware features based at least on the intermediate representation and the code corresponding to the ML model;
   determining a number of hardware instructions based at least on the intermediate representation and the code corresponding to the ML model; and generating the plurality of scores using the hardware-specific cost model, the one or more hardware features, and the number of hardware instructions.

7. The computer-implemented method of claim 6, wherein each term of the hardware-specific cost model is associated with a coefficient associated with the hardware platform.

8. The computer-implemented method of claim 6, wherein determining a number of hardware instructions based at least on the intermediate representation and the code corresponding to the ML model, further comprises:
identifying one or more loop structures in the intermediate representation;
identifying one or more corresponding blocks of the code corresponding to the ML model that match the one or more loop structures; and
counting a number of hardware instructions in the matching one or more corresponding blocks of the code.

9. The computer-implemented method of claim 8, wherein the hardware instructions include single instruction multiple data (SIMD) assembly code instructions or parallel thread execution (PTX) instructions.

10. The computer-implemented method of claim 6, wherein extracting one or more hardware features based at least on the intermediate representation and the code corresponding to the ML model further comprises:
identifying a plurality of loop nodes in the intermediate representation;
determining a data movement and data footprint for each loop node from the plurality of loop nodes; and
determining a cache localization feature based on the data movement and data footprint for each loop node.

11. The computer-implemented method of claim 9, wherein extracting one or more hardware features based at least on the intermediate representation and the code corresponding to the ML model further comprises estimating parallelization efficiency using a parallelization model that simulates instruction level parallelization for each block of the code corresponding to the ML model.

12. The computer-implemented method of claim 9, wherein extracting one or more hardware features based at least on the intermediate representation and the code corresponding to the ML model further comprises:
determining a workload per thread;
determining a streaming multiprocessor usage; and
determining a single block resource utilization.

13. The computer-implemented method of claim 4, wherein the ML model is an image classification model, an object detection model, an image segmentation model, or a natural language processing model.

14. A system comprising:
a first one or more electronic devices implementing a storage service; and
a second one or more electronic devices implementing a machine learning service, the machine learning service including instructions that upon execution cause the machine learning service to:
obtain a deep neural network (DNN) machine learning (ML) model from the storage service;
generate an intermediate representation for the ML model, the intermediate representation including one or more nodes corresponding to one or more operators utilized by the ML model;
identify, for at least one node of the intermediate representation, an optimized schedule for at least one operator corresponding to the at least one node using a static analysis that is based on a hardware-specific cost model;
generate an optimized intermediate representation using the optimized schedule that is optimized for execution on a hardware platform from among a plurality of hardware platforms; and
generate code corresponding to the ML model based at least in part on the optimized intermediate representation, wherein the code is specific to the hardware platform.

15. The system of claim 14, wherein to identify, for the at least one node of the intermediate representation, an optimized schedule for at least one operator corresponding to the at least one node using a static analysis that is based on a hardware-specific cost model, the instructions, when executed, further cause the machine learning service to:
generate a plurality of scores for a plurality of schedules for the at least one node of the intermediate representation using the hardware-specific cost model, the hardware-specific cost model including terms corresponding to different features of the hardware platform; and
identify the optimized schedule based on the plurality of scores using a parallel black box search algorithm.

16. The system of claim 15, wherein to identify, for the at least one node of the intermediate representation, an optimized schedule for at least one operator corresponding to the at least one node using a static analysis that is based on a hardware-specific cost model, the instructions, when executed, further cause the machine learning service to:
extract one or more hardware features based at least on the intermediate representation and the code corresponding to the ML model;
determine a number of hardware instructions based at least on the intermediate representation and the code corresponding to the ML model; and
generate the plurality of scores using the hardware-specific cost model, the one or more hardware features, and the number of hardware instructions.

17. The system of claim 16, wherein each term of the hardware-specific cost model is associated with a coefficient associated with the hardware platform.

18. The system of claim 16, wherein to determine a number of hardware instructions based at least on the intermediate representation and the code corresponding to the ML model, the instructions, when executed, further cause the machine learning service to:
identify one or more loop structures in the intermediate representation;
identify one or more corresponding blocks of the code corresponding to the ML model that match the one or more loop structures; and
count a number of hardware instructions in the matching one or more corresponding blocks of the code.

19. The system of claim 18, wherein the hardware instructions include single instruction multiple data (SIMD) assembly code instructions or parallel thread execution (PTX) instructions.

20. The system of claim 18, wherein to extract one or more hardware features based at least on the intermediate representation and the code corresponding to the ML model, the instructions, when executed, further cause the machine learning service to:
identifying a plurality of loop nodes in the intermediate representation;
determining a data movement and data footprint for each loop node from the plurality of loop nodes; and determining a cache localization feature based on the data movement and data footprint for each loop node.

* * * * *